United States Patent
Uhlig et al.

(10) Patent No.: US 8,595,618 B2
(45) Date of Patent: *Nov. 26, 2013

(54) DYNAMIC VARIABLE-CONTENT PUBLISHING

(71) Applicant: Uhlig LLC, Overland Park, KS (US)

(72) Inventors: Mark A. Uhlig, Leawood, KS (US); Kristina M. Hayes, Kansas City, MO (US); Justin B. Hansen, Olathe, KS (US); Arthur S. French, Kansas City, MO (US); Lauretta Jo Schultz, Shawnee, KS (US); Amy J. Geisler, Olathe, KS (US)

(73) Assignee: Uhlig LLC, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/866,934

(22) Filed: Apr. 19, 2013

(65) Prior Publication Data

US 2013/0246907 A1  Sep. 19, 2013

Related U.S. Application Data

(63) Continuation of application No. 11/581,870, filed on Oct. 16, 2006, now Pat. No. 8,438,476.

(60) Provisional application No. 60/727,217, filed on Oct. 14, 2005.

(51) Int. Cl.
*G06F 17/00* (2006.01)

(52) U.S. Cl.
USPC ........... 715/251; 715/252; 715/253; 715/273; 715/274; 715/276; 715/277

(58) Field of Classification Search
USPC .................................................. 715/255, 273
See application file for complete search history.

(56) References Cited

U.S. PATENT DOCUMENTS

| 5,241,464 | A  | * | 8/1993  | Greulich et al. | 705/26.5  |
| 5,493,490 | A  | * | 2/1996  | Johnson         | 705/26.4  |
| 5,615,342 | A  | * | 3/1997  | Johnson         | 705/26.63 |
| 5,963,968 | A  | * | 10/1999 | Warmus et al.   | 715/246   |
| 6,088,710 | A  | * | 7/2000  | Dreyer et al.   | 715/246   |
| 6,167,382 | A  | * | 12/2000 | Sparks et al.   | 705/14.73 |
| 6,205,452 | B1 | * | 3/2001  | Warmus et al.   | 715/246   |
| 6,243,172 | B1 | * | 6/2001  | Gauthier et al. | 358/1.18  |
| 6,327,599 | B1 | * | 12/2001 | Warmus et al.   | 715/246   |
| 6,332,149 | B1 | * | 12/2001 | Warmus et al.   | 715/246   |
| 6,446,100 | B1 | * | 9/2002  | Warmus et al.   | 715/246   |
| 6,462,756 | B1 | * | 10/2002 | Hansen et al.   | 715/764   |
| 6,509,974 | B1 | * | 1/2003  | Hansen          | 358/1.12  |

(Continued)

*Primary Examiner* — Nathan Hillery

(74) *Attorney, Agent, or Firm* — Fenwick & West LLP

(57) ABSTRACT

A product creator system includes a business application and a distribution utility. The business application enables a user to specify and/or edit (via a user client) a document. The business application generates a packet that is transmitted to the distribution utility. The packet describes the document, such as a document of a particular type (where the document is based on variable content and/or variable layout), and a distribution method for the document. Distribution methods include print, ship, mail, fax, email, and save. The distribution utility generates and distributes the document (via an output device) based on the packet. The business application, which can be used with a variety of distribution utilities, includes a web front-end and a packet generator. The distribution utility, which can be used with a variety of business applications, includes control logic and a document processor. The document processor helps generate the document.

20 Claims, 16 Drawing Sheets

(56) References Cited

U.S. PATENT DOCUMENTS

| | | | |
|---|---|---|---|
| 6,631,375 B2* | 10/2003 | Jecha et al. | 1/1 |
| 6,632,251 B1* | 10/2003 | Rutten et al. | 715/205 |
| 6,704,120 B1* | 3/2004 | Leone, III et al. | 358/1.18 |
| 6,826,727 B1* | 11/2004 | Mohr et al. | 715/235 |
| 6,844,940 B2* | 1/2005 | Warmus et al. | 358/1.18 |
| 6,952,801 B2* | 10/2005 | Warmus et al. | 715/251 |
| 6,992,786 B1* | 1/2006 | Breding et al. | 358/1.15 |
| 2002/0111963 A1* | 8/2002 | Gebert et al. | 707/513 |
| 2002/0122067 A1* | 9/2002 | Geigel et al. | 345/788 |
| 2003/0202213 A1* | 10/2003 | Saito | 358/1.18 |
| 2004/0001217 A1* | 1/2004 | Wu | 358/1.15 |
| 2004/0061897 A1* | 4/2004 | Onishi | 358/1.15 |
| 2004/0088245 A1* | 5/2004 | Narayan et al. | 705/38 |
| 2004/0088647 A1* | 5/2004 | Miller et al. | 715/500 |
| 2004/0177316 A1* | 9/2004 | Layzell et al. | 715/500 |
| 2005/0063010 A1* | 3/2005 | Giannetti | 358/1.18 |
| 2005/0122542 A1* | 6/2005 | Gimenez et al. | 358/1.18 |
| 2005/0125724 A1* | 6/2005 | Peiro et al. | 715/517 |
| 2005/0154980 A1* | 7/2005 | Purvis et al. | 715/513 |
| 2005/0289461 A1* | 12/2005 | Amado et al. | 715/530 |
| 2006/0114490 A1* | 6/2006 | Rolleston | 358/1.14 |
| 2006/0155699 A1* | 7/2006 | Purvis et al. | 707/6 |
| 2008/0126936 A1* | 5/2008 | Williams | 715/717 |

* cited by examiner

DYNAMIC VARIABLE-CONTENT PUBLISHING

CROSS-REFERENCE TO RELATED APPLICATIONS

This application is a continuation of U.S. patent application Ser. No. 11/581,870, filed Oct. 16, 2006, entitled "Dynamic Variable-Content Publishing" which claims the benefit of U.S. Provisional Patent Application No. 60/727,217, filed Oct. 14, 2005, entitled "Online Method for Creation of a Publication", both of which are hereby incorporated by reference.

BACKGROUND OF THE INVENTION

1. Field of the Invention

The present invention relates to creating different types of documents which can be distributed in different ways. More particularly, the present invention relates to a system that can be used to create and distribute different types of documents that are based on variable content and/or variable layout.

2. Description of Background Art

A document is defined by two principal characteristics: content and layout. Content can include the broadest possible spectrum of text, numerical data, artwork, images, graphics, and symbols. Layout is generally defined as the spatial arrangement of content on a two-dimensional surface (such as a page). This two-dimensional surface can itself be arranged together with other such surfaces as part of a set of pages (such as a magazine or book). Page sets can be further arranged into sets of page sets (such as volumes), possibly including additional dependent elements such as covers, tables of contents, and indexes.

Traditionally, content and layout have been specified manually. A writer or artist created content, and a graphic designer or paste-up artist arranged the content into a page layout (also known as formatting). Recently, software has been created to help people perform some of these tasks. For example, writers can use word processing programs such as Microsoft Word, and artists can use graphics programs such as Adobe Illustrator, in order to create content. Graphic designers and paste-up artists use page make-up software such as Adobe InDesign to manually create layouts.

Notwithstanding the incremental improvements in efficiency offered by these software tools, the process of creating and formatting documents has remained essentially a manual process, relying on the skill and judgment of a human operator. Even when a document requires a change in only one of the two principal characteristics (e.g., new content within a fixed layout or fixed content within a new layout), existing software offers little or no support. When both characteristics change, human intervention is required, which severely restricts the speed, efficiency, and scale with which complex customized documents can be created.

While some software applications support the mixing and matching of content and layout to produce rudimentary substitution of content, such as the merging of mailing addresses or the replacement of account data in billing statements, these applications are highly specialized and support neither highly-variable content nor highly-variable layout. Each layout must be used with a particular number of content objects, and the content objects must be of a particular size and/or shape.

Because current methods—even those based on software—are so heavily dependent on human intervention and control, the potential for integrating simultaneous streams of diverse content from multiple sources and making complex layout choices is necessarily constrained by the limits of human ability. In addition, given the difficulty of monitoring and controlling human input on a comprehensive or systematic basis, the reliance of current methods on human intervention dramatically complicates and increases the cost of supervising production and ensuring quality in large-scale production of customized documents.

What is needed is a document creation system that can define the content and/or layout of a document automatically based on rules or algorithms with little or no user input, interaction, or intervention. With such a system, a layout would be dynamically defined for each document based on the content that was selected (and possibly also based on some high-level design decisions). The system would replace the artistic, aesthetic, and subjective tasks currently performed by people. Since these tasks are not mechanical, it is very difficult to automate them. However, the successful development of such a system would yield a broad range of economic and social benefits.

SUMMARY OF THE INVENTION

Systems, methods, and computer program products are presented for creating a document of a particular type, where the document is based on variable content and/or variable layout. In one embodiment, the system includes a business application and a distribution utility. The business application is configured to receive information, wherein the information specifies document content and document layout, and to generate, based on the received information, eXtensible Markup Language (XML) code that describes the document. The distribution utility is configured to receive the XML code and to generate, based on the received code, the document.

A first business application provides a user interface that enables a user to specify and/or edit (via a user client) a magazine and a method of distribution. The first business application also provides user interfaces for viewing production status and account information and for managing production status and account information.

A second business application provides a user interface that enables a user to place an order for resale documents (documents required for the transfer, sale, and/or purchase of a residential home), pay for the order, and track the status of the order. The second business application also provides user interfaces for managing and monitoring the system and for creating and configuring resale document formats, adding new data to include in the resale documents, and managing production status or account information.

A third business application provides a user interface that enables a user to create notices (such as cyclical notices that are statutorily required to be distributed to occupants of units in some communities in certain municipalities), pay for the notices, and track the status of the notices. The third business application also provides a user interface for creating notice formats, adding new data to include in the notices, and managing production status or account information.

BRIEF DESCRIPTION OF THE DRAWINGS

The invention is illustrated by way of example, and not by way of limitation, in the figures of the accompanying drawings in which like reference numerals refer to similar elements.

Figure 6C:
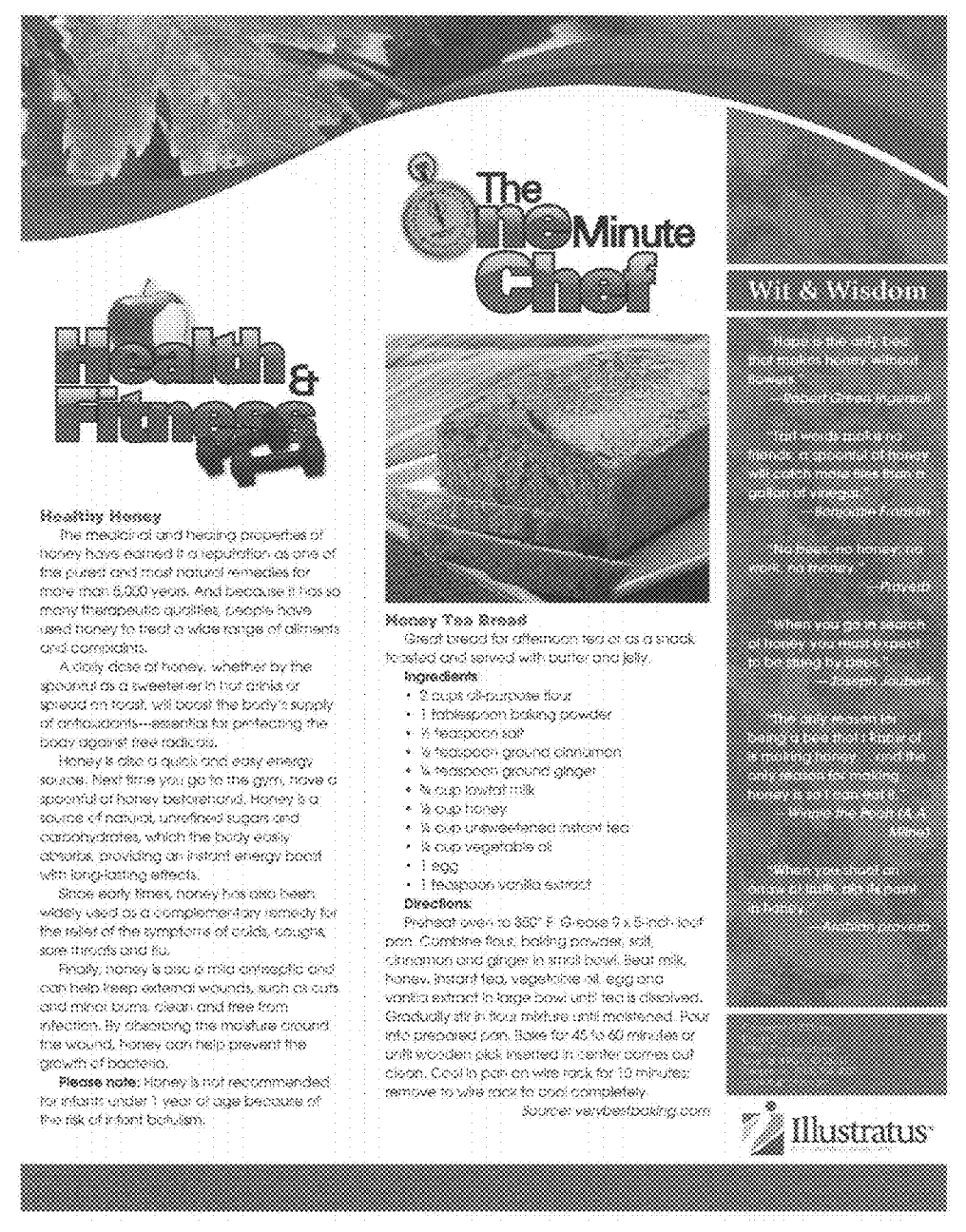

FIGS. 6A-6D each illustrate one page of a newsletter, according to one embodiment of the invention.

DETAILED DESCRIPTION OF THE EMBODIMENTS

Figure 1:
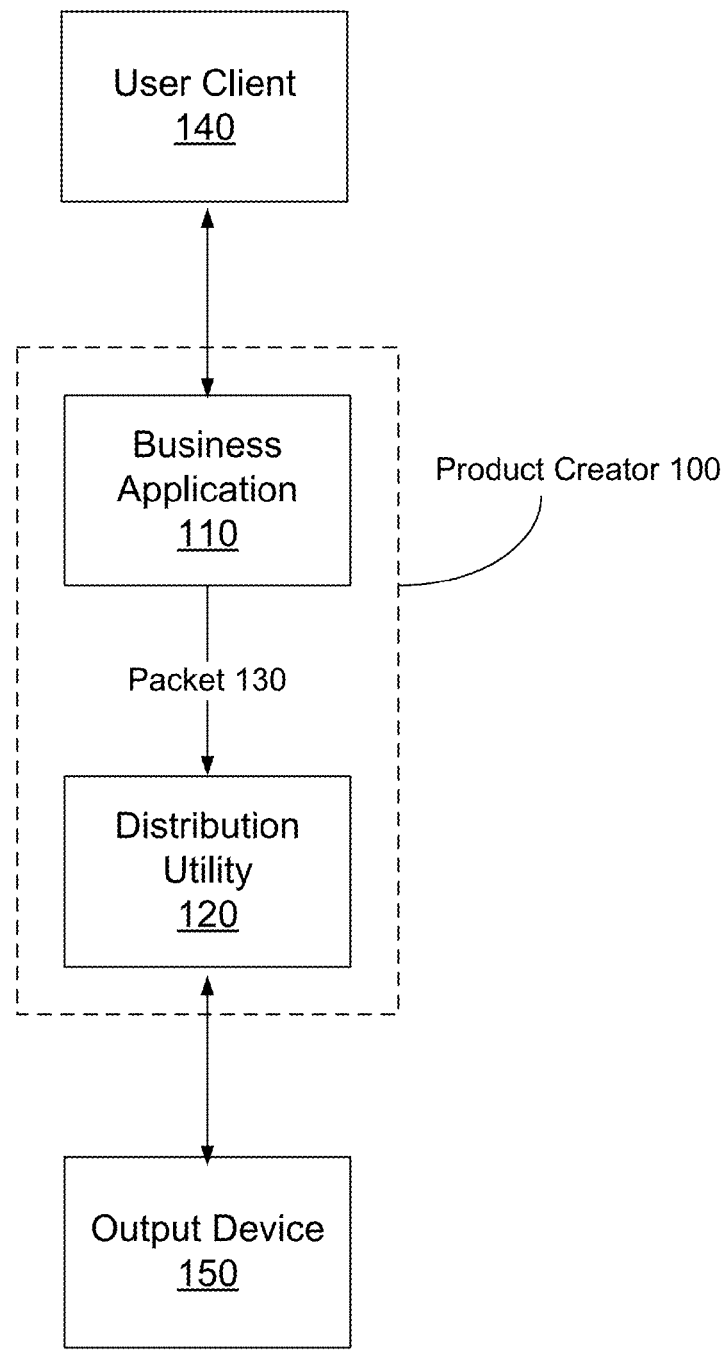
FIG. 1 illustrates a diagram of a product creator, according to one embodiment of the invention.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to an apparatus for performing the operations herein. This apparatus is specially constructed for the required purposes, or it comprises a general-purpose computer selectively activated or reconfigured by a computer program stored in the computer. Such a computer program is stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems are used with programs in accordance with the teachings herein, or more specialized apparatus are constructed to perform the required method steps. The required structure for a variety of these systems will appear from the description below. In addition, the present invention is not described with reference to any particular programming language. It will be appreciated that a variety of programming languages can be used to implement the teachings of the invention as described herein.

1. Creation of Different Types of Documents that can be Distributed in Different Ways A system called a "product creator" is used to create and distribute different types of documents, such as different types documents that are based on variable content and/or variable layout. As used herein, the term "document" refers generally to any type of publication in any form, including (but not limited to) a piece of written, printed, or electronic matter that provides information or evidence; anything serving as a representation of a person's thinking by means of symbolic marks; writing that provides information (including information of an official nature); a formal piece of writing that provides information or acts as a record of events or arrangements; a writing conveying information; or a paper or set of papers with written or printed information, including of an official type.

Examples of a document include, but are not limited to, a magazine, newsletter, book, folder, letter, certificate, report, brochure, pamphlet, booklet, leaflet, catalog, publication, periodical, prospectus, circular, guide, handbook, workbook, manual, journal, register, volume, page(s), directory, declaration, manuscript, script, contract, testament, record, chart, dossier, material, questionnaire, query, survey, research, newssheet, communication, discourse, interview, narrative, tract, treatise, album, concordance, tome, epic, paperback, log, primer, textbook, annual, ledger, posting, spreadsheet, account, index, library, collection, series, print, edition, issue, tabloid, proof, composition, galley, layout, conveyance, instrument, and review.

In one embodiment, a product creator 100 is used to create and distribute the following types of documents: magazines, resale documents, and annual notices. In other embodiments, the product creator 100 is used to create and distribute other types of documents.

A product creator 100 can create documents that are based on highly-variable content and/or highly-variable layout. For example, not only can the content on a page vary, but the number of pages in a book or volume and the number of books or volumes in a boxed set can also vary.

In one embodiment, the product creator 100 uses algorithms or rules during various parts of the publishing process to substantially digitize and/or automate the process. For example, the creation and distribution of a document is generally accomplished by a team of people such as content creators, editors, customers (who ultimately purchase the document), and publishing supervisors. Since the document is generated algorithmically, it is embodied in electronic form. This means that a document can be accessed from various locations by various people over a network. Also, a person's access to a document can be restricted or customized based on her role in the publishing process.

In one embodiment, audit trails and/or archives are incorporated into the publishing process, including creation and/or distribution. Since the publishing process is electronic, logs can be automatically generated that reflect publishing operation and status. Documents that are created can be archived and searched. Real-time reports and alerts can be generated and sent to users or other software applications. Accounting can also be integrated into the publishing process.

FIG. 1 illustrates a diagram of a product creator, according to one embodiment of the invention. In the illustrated embodiment, the product creator 100 includes a business application 110 and a distribution utility 120 that are communicatively coupled. FIG. 1 also includes a user client 140 and an output device 150. The user client 140 is communicatively coupled to the business application 110 (e.g., via a network such as the Internet or some other network that is public or private, hardwired or wireless). The output device 150 is communicatively coupled to the distribution utility 120. In one embodiment, the business application 110, distribution utility 120, user client 140, and output device 150 are each located in different places and/or executed on different machines. In another embodiment, two or more of these elements are located in the same place and/or executed on the same machine.

The business application 110 enables a user to specify and/or edit (via the user client 140) a document that is based on variable content and/or variable layout. In one embodiment, the document is of a particular type, such as a magazine, resale document, or annual notice. In this embodiment, a business application 110 is configured to work with a document of a particular type. For example, consider three different business applications 110: one for working with magazines, one for working with resale documents, and one for working with annual notices. Any one of these business applications 110 can be used in the product creator 100. In one embodiment, the business application 110 enables a user to specify and/or edit (via the user client 140) a distribution method for the document.

The distribution utility 120 generates and distributes a document that is based on variable content and/or variable layout. In one embodiment, several methods of distribution are available, including print, ship, mail, fax, email, and save. In this embodiment, a distribution utility 120 is configured to distribute a document using a particular method. For example, consider six different distribution utilities 120: one for distribution via print, one for distribution via ship, one for distribution via mail, one for distribution via fax, one for distribution via email, and one for distribution via save. Any one of these distribution utilities 120 can be used in the product creator 100. Also, additional distribution utilities 120 are possible as known to those of ordinary skill in the art. For example, an electronic version of a document can be converted into a web page, saved onto a disk and mailed (e.g., a CD-ROM), or included within a web log or web feed (e.g., a web feed according to the Really Simple Syndication (RSS) file format). Other distribution utilities 120 can use new technologies as the technologies are created.

The interchangeability of business applications 110 and distribution utilities 120 means that the product creator model can be used to create many different types of products, where a product is a combination of a business application 110 and a distribution utility 120. For example, the combination of three types of business applications 110 and six types of distribution utilities 120 yields 18 different types of products. Each of these business applications 110 and distribution utilities 120 will be described below.

The user client 140 comprises a software application or device that enables a user to communicate with the business application 110. In one embodiment, the user client 140 comprises a software application that enables a user to browse the World Wide Web, such as Internet Explorer (from Microsoft Corporation of Redmond, Wash.), Safari (from Apple Computer, Inc. of Cupertino, Calif.), Firefox (from Mozilla Corporation of Mountain View, Calif.), or Netscape Browser (from AOL LLC of Dulles, Va.). The web browser is run on any suitable device, such as a desktop computer, laptop computer, personal digital assistant (PDA), or telephone. Although FIG. 1 includes only one user client 140, any number of user clients 140 can be communicatively coupled to the business application 110.

The output device 150 comprises a software application or physical entity that enables a document to be distributed. Different output devices 150 are useful for different distribution methods. For example, a printer is useful for a print distribution method, while an email server is useful for an email distribution method. Although FIG. 1 includes only one output device 150, any number of output devices 150 can be communicatively coupled to the distribution utility 120. Multiple output devices 150 are useful, for example, if a deliverable document includes components that are generated by different output devices 150 (e.g., a folder from one device and inner pages from another device). Output devices 150 will be discussed below.

The business application 110 generates a packet 130 that is transmitted to the distribution utility 120. The distribution utility 120 generates the document based on the packet 130. A packet 130 is a collection of information. The packet 130 can be in any format, such as a file or a stream. The information in the packet 130 describes a deliverable document, such as a particular document of a particular type, where the document is based on variable content and/or variable layout. In one embodiment, the packet 130 includes data that represents text that is formatted using eXtensible Markup Language (XML). The portion of the packet 130 that describes the document is referred to as the document portion. In one embodiment, the packet 130 also describes a distribution method for the document. In this embodiment, the portion of the packet 130 that describes the distribution method is referred to as the distribution portion.

The distribution utility 120 distributes a document according to distribution instructions. In one embodiment, these instructions are present in the packet 130 (specifically, in the distribution portion of the packet 130). In another embodiment, these instructions are stored elsewhere and accessed by the distribution utility 120. For example, the business application 110 saves the instructions to memory where they can be accessed by the distribution utility 120. The remainder of this document will assume that a packet 130 includes a distribution portion. However, it is also possible for distribution instructions to be located elsewhere.

In one embodiment, the business application 110 enables a user to specify and/or edit (via the user client 140) a distribution method for a document. In another embodiment, a distribution method is specified automatically without user input.

2. Distribution Utility

As described above, a business application 110 generates a packet 130 that is transmitted to a distribution utility 120. The distribution utility 120 generates and distributes a deliverable document based on the packet 130.

Figure 2:
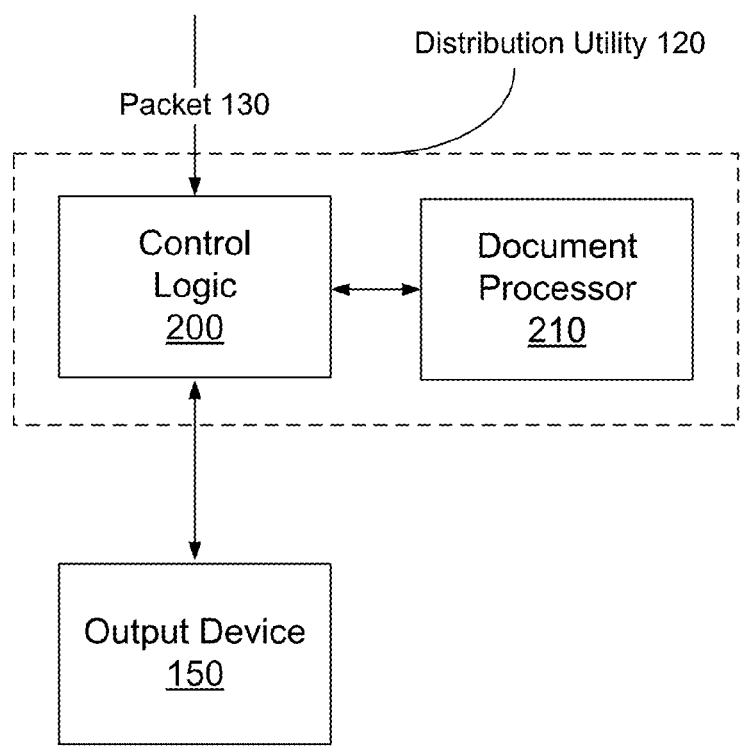
FIG. 2 illustrates a diagram of a distribution utility, according to one embodiment of the invention.

FIG. 2 illustrates a diagram of a distribution utility, according to one embodiment of the invention. In the illustrated embodiment, the distribution utility 120 includes control logic 200 and a document processor 210. The control logic 200 is communicatively coupled to the document processor 210. The document processor 210 provides various types of functionality for processing a packet 130 (specifically, the document portion of the packet 130). The control logic 200 generates and distributes a deliverable document using the document processor 210.

FIG. 2 also shows a packet 130 and an output device 150. These elements were described with reference to FIG. 1. The packet 130 is input to the control logic 200. The output device 150 is communicatively coupled to the control logic 200.

A. Packet

The document portion of a packet 130 describes a document, including both the document's content and the document's layout. In one embodiment, the document portion is written in a new, proprietary markup language called Variable Print Markup Language (VPML). VPML is similar to HTML but changes some of the HTML attributes and values and extends HTML by adding some new elements ("tags"). In one embodiment, a new element is included within a CDATA (character data) section, as described in Standard Generalized Markup Language (SGML). VPML code can refer to external files, including an image or a page within a PDF or PostScript document.

In another embodiment, VPML can be used in conjunction with styles, similar to HTML. A style describes how document content should be presented, such as which colors, fonts, and layouts to use. A style is defined within VPML code or within a VPML element (e.g., using the "style" attribute) or in a separate stylesheet that is referenced by VPML code. In one embodiment, a stylesheet is written in a language that is similar to the Cascading Style Sheets (CSS) language but also includes some changes and extensions.

Appendix A includes a description of VPML, including new, proprietary elements and selected HTML elements. Appendix A also includes a description of styles, including new, proprietary properties and values and selected CSS properties and values. VPML will be further described below in conjunction with the document processor 210.

The distribution portion of a packet 130 includes information regarding how a document should be rendered and/or distributed, such as the method of distribution and any data that is needed to perform the distribution. In one embodiment, the methods of distribution and their accompanying data are as follows:

Print distribution—A tangible copy of the document is produced. The document is distributed manually (e.g., by a customer picking it up from a publisher). In one embodiment, a packet 130 that specifies print as a method of distribution is referred to as a "job," since "job" commonly refers to something that has been sent to be printed. Accompanying data includes identification of a queue (see below) that should be used to process a job in order to produce a document. In one embodiment, accompanying data includes instructions regarding triggering alerts during a job's lifecycle.

A queue is responsible for processing a job throughout its lifecycle, from acceptance through production (processing) to completion. Processing includes converting content defined in the job (specifically, in the job's document portion) into a print product (such as PostScript code; e.g., PostScript® 3™, from Adobe Systems Incorporated of San Jose, Calif.) that can be rendered by an output device 150. A queue can process jobs alone or in batches. A queue is generally created for producing a particular type of document (e.g., a magazine). In one embodiment, a queue is defined and/or configured by XML code.

An output device 150 can be, for example, a physical entity or a software application. In one embodiment, an output device 150 includes one of the following: a printer, a distiller, and a decomposition service. Communication with an output device 150 can take many different forms, such as Line Printer Remote (LPR) protocol, telnet, a batch file, and a watched-folder printing utility (such as Batch & Print Pro 2.04 from Traction Software Limited of the United Kingdom).

A printer can be, for example, a NexPress 2100 (from Kodak of Rochester, N.Y.), an iGen3® digital production press (from Xerox Corporation of Stamford, Conn.), an Indigo press (from Hewlett-Packard Company of Palo Alto, Calif.), a DocuTech™ 6100 production publisher (Xerox), a DocuPrint™ N4525 network laser printer (Xerox), a Nuvera 120 (Xerox), a DigiMaster (Kodak), an imageRUNNER 125 or 400 (from Canon USA, Inc., of Lake Success, N.Y.), a 4110 (Xerox), a DocuColor 4525 (Xerox), a CLC 5100 (Canon), a WorkCentre® Pro 90 advanced multifunction system (Xerox) or any printing device that is compatible with the PostScript page description language.

Depending on the particular file formats and printers concerned, it may be useful to use a distiller and/or decomposition service. A distiller, such as Adobe's Acrobat Distiller, accepts a file written in PostScript and converts it into a file written in Portable Document Format (PDF) (from Adobe Systems Incorporated of San Jose, Calif.). Decomposition is translation of a file written in a page description language (PDL). Decomposition, which is performed by a printer, can be very time-consuming if the file is complex. A decomposition service, such as the Decomposition Service within the DocuPrint Network Printer Series (NPS)/IPDS Printer Series (IPS) software (from Xerox Corporation of Stamford, Conn.), decomposes a document once and then stores it as a "form." This form, which is in Tagged Image File Format (TIFF), can be printed twice to five times faster than the original document can be printed.

In print distribution, output devices 150 modify (e.g., print on) various kinds of physical, hard copy materials (plain, glossy, transparent, etc.) to produce the deliverable document. In one embodiment, these materials are subjected to various finishing processes such as cutting, folding, boxing, and labeling. The materials can be used in different ways to organize and assemble the deliverable document (e.g., box, book cover and contents, folder cover and contents, booklet, and label). In one embodiment, instructions regarding how to "finish" a job are included in one or more job tickets. A job ticket can include a barcode that, once scanned, indicates that the instructions on the job ticket have been performed successfully. In this way, the status of the finishing process can be tracked.

Ship distribution—Multiple tangible copies of one document or tangible copies of multiple documents are produced and mailed to the same address (e.g., for later distribution). Accompanying data includes the shipping address and any print data.

Mail distribution—Tangible copies of multiple documents are produced and mailed to different addresses. Accompanying data includes the different mailing addresses and any print data.

Fax distribution—The document is faxed. Accompanying data includes the fax number.

Email distribution—The document is emailed. Accompanying data includes the email address and the desired format for the document. Possible formats can include, for example, PostScript, PDF, Joint Photographic Experts Group (JPEG), Graphics Interchange Format (GIF), Tagged Image File Format (TIFF), Portable Network Graphics (PNG), and bitmap.

Save distribution—The document is saved to memory or another type of electronic storage. A software application ("viewer") can be launched to load the saved document and enable a user to view it. Accompanying data includes where the document should be saved (e.g., a device name and a file path within the device) and the format in which the document should be saved. Possible formats can include, for example, PostScript, PDF, JPEG, GIF, TIFF, and PNG.

In one embodiment, the distribution portion of a packet 130 includes information regarding multiple distribution methods. In this embodiment, the document can be distributed according to one or more of the distribution methods. For example, the distribution portion can include one or more rules that specifies which distribution method should be used and when. One exemplary rule is try to fax the document; if the fax fails, mail the document. Another exemplary rule is always fax and email the document. In this embodiment, the product creator 100 would include multiple distribution utilities 120.

B. Document Processor

Figure 3:
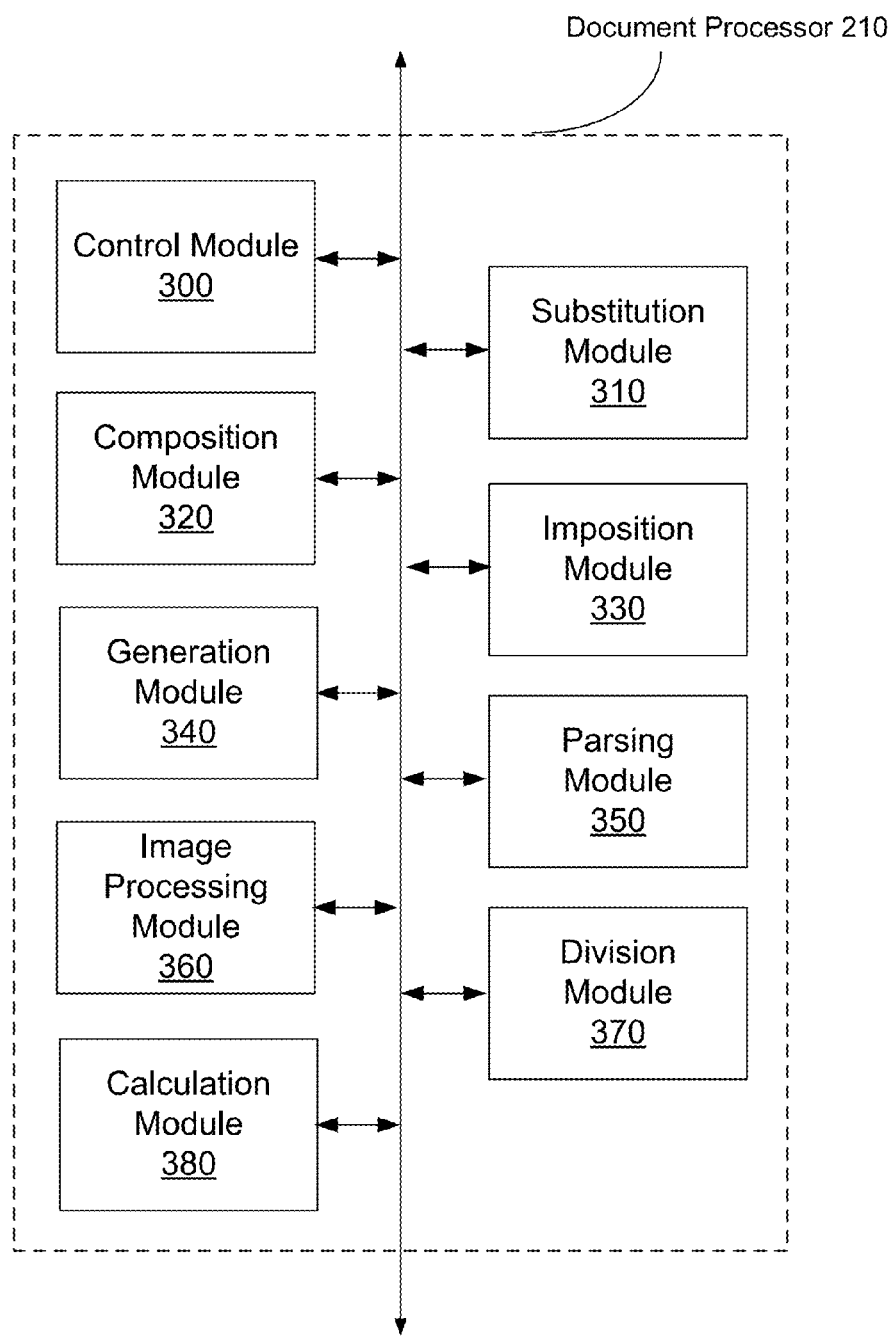
FIG. 3 illustrates a diagram of a document processor, according to one embodiment of the invention.

As described above, a document processor 210 provides various types of functionality for processing a packet 130 (specifically, the document portion of the packet 130). A document processor 210 includes various modules, each of which is configured to provide a particular functionality. FIG. 3 illustrates a diagram of a document processor, according to one embodiment of the invention. In the illustrated embodiment, the document processor 210 includes a control module 300, a substitution module 310, a composition module 320, an imposition module 330, a generation module 340, a parsing module 350, an image processing module 360, a division module 370, and a calculation module 380. All of the modules are communicatively coupled to each other.

For some of these modules, their operation can change based on one or more parameters. In one embodiment, a parameter is input into a module separately from other input values. In another embodiment, a parameter is combined with other input values when it is input into a module. For example, consider a module that modifies an input string. In the former embodiment, the string would be a first input value, and the parameter would be a second input value. In the latter embodiment, the parameter would be embedded in the string, and the resulting string would be the only input to the module.

This latter embodiment is used by some of the modules in the document processor 210. Recall that the document portion of a packet 130 describes a document, including both the document's content and the document's layout. Consider a module that processes this document portion in order to use the specified content and layout to create a final document. The module takes as input VPML code that describes the content and layout. In one embodiment, the VPML code also includes parameters for the module that control the module's operation. These parameters are in the form of new, proprietary tags and attributes. They will be discussed below in conjunction with the module that they control. For more information, see Appendix A.

Control module—The control module 300 controls the operation of the document processor 210. The control module 300 uses the other modules to perform various tasks. The control module 300 will be discussed below in conjunction with FIG. 4.

Substitution module—The substitution module 310 processes VPML code. In other words, VPML code is both input to and output from the substitution module 310. The operation of the substitution module 310 is specified by "substitution tags" that act as parameters, as explained above. If the input VPML does not include any substitution tags, then the output VPML and input VPML are identical. If the input VPML does include a substitution tag, then the output VPML and input VPML can differ. In one embodiment, substitution tags include <choose>, <when>, <otherwise>, <pagenumber>, and <variable>.

The <choose>, <when>, and <otherwise> tags enable conditional logic. A <when> tag functions like an "if" statement. It includes an attribute entitled "test" that is an expression whose value evaluates to a Boolean. A pair of <when> tags surrounds data. If the Boolean is "true," then the pair of <when> tags are removed and the surrounded data is included in the output VPML. If the Boolean is "false," then the pair of <when> tags are removed and the surrounded data is not included in the output VPML. An <otherwise> tag functions like an "else" statement and is used in pairs to surround data. A pair of <choose> tags surrounds one or more <when> and/or <otherwise> pairs and is removed after the surrounded <when> and <otherwise> pairs have been processed. If a <pagenumber> tag is present in input VPML, it is replaced with the page number of the current page.

The <variable> tag functions like a variable. It includes an attribute entitled "name" that is an expression that references a piece of data. This expression can include an evaluation function (see Appendix A). If a <variable> tag is present in input VPML, it is replaced with the content referenced in the name attribute. In one embodiment, the data is a template that defines how a document should be formatted. For example, a data store (such as a database) serves as a repository and registry of templates, called a "template library" (not shown). A template is a set of rules (e.g., conditions or definitions regarding the sizing and/or placement of content) governing the construction (e.g., design and/or layout) of a document. In one embodiment, a template describes a document's header and footer, background, and/or body layout. A template can also describe a portion of a document, such as one page of the document or one portion of one page of the document. In one embodiment, multiple templates are used together to describe a particular type of document that is based on variable content and/or variable layout. One template can be used with different content pieces.

In another embodiment, the data is a piece of content (such as a block of text or a reference to an image). For example, a data store (such as a database), serves as a repository and registry of content (resources), called a "resource library" (not shown). Content can be used in conjunction with a template. Content can be stock or custom. Content can also be text (possibly including VPML) or file-based, including images of any type. One content piece can be used with different templates. In one embodiment, a resource is added to a resource library via a resource processing module (not shown). For example, the resource processing module manages and processes a scanned document and adds it to the resource library so that it can be used in conjunction with a template.

In one embodiment, the value of the "name" attribute is based on data that exists within the packet 130 itself. In another embodiment, the value is based on data that exists in an external data store such as a database. A substitution tag can be used in any portion of the described document, including in a template. A template is defined by a <flowingpage> tag, which is discussed below with reference to the composition module 320.

Composition module—The composition module 320 also processes VPML code. The operation of the composition module 320 is specified by composition tags. If the input VPML does not include any composition tags, then the output VPML and input VPML are identical. If the input VPML does include a composition tag, then the output VPML and input VPML can differ. In one embodiment, composition tags include <content>, <flowingsection>, <flowingpage>, <useflowingpage>, <flowingcontent>, and <repeatreset>.

The composition module 320 "flows" content into columns, sections, and/or pages. For example, if a section is defined so as to fill a page (from top to bottom and from side to side) and the content to be placed in the section is longer than the section height, then the composition module generates one or more additional pages (e.g., by adding one or more  tags to the input VPML) to accommodate the remaining content until all of the remaining content is included. Content flow from one column to the next on the same page is similar. In one embodiment, the composition module uses the division module (see below).

A pair of <content> tags surrounds content that is to be "flowed." A composition attribute entitled "nobreak" can be used in conjunction with a pair of <div>, <table>, <tr>, or <td> tags. Use of this attribute specifies that content contained by these tags should not be divided; instead, the entire content is forced to the next section or page. A <flowingsection> tag defines a rectangular area through which the content (specified by the <content> tags) will be flowed. A <flowingpage> tag defines a page-sized template through which content is flowed (via use of a flowingsection). A pair of <flowingcontent> tags designates one or more pages of output that will be the result of flowing content.

Imposition module—The imposition module 330 also processes VPML code. The operation of the imposition module 330 is specified by imposition tags. If the input VPML does not include any imposition tags, then the output VPML and input VPML are identical. If the input VPML does include an imposition tag, then the output VPML and input VPML can differ. In one embodiment, imposition tags include <newsletter>, <folder>, <twoupimposition>, and <book>.

The imposition module 330 takes as input content divided into one or more pages of a first size and outputs that same content divided into one or more pages of a second size. In one embodiment, this is performed by changing the position of a  tag within VPML code (e.g., with respect to other tags). For example, the location of a  tag in input VPML reflects pages of the first size, while the location of a  tag in output VPML (i.e., after the imposition module has completed operation) reflects pages of the second size. If the first size and the second size are equal, then the input VPML and the output VPML are identical. In other words, the  tags are not moved.

In one embodiment, the first size represents a logical page, while the second size represents a physical page (e.g., a sheet of paper). For example, one physical page can include multiple logical pages. For example, an 18"×12" physical page can be folded in half to present two 9"×12" logical pages on each side of the physical page. The edges of these pages are then cut off, leaving two 8.5"×11" pages. In one embodiment, one physical page corresponds to one sheet of material such as paper. The imposition module can also add "cut" marks to indicate where a sheet of material should be cut (e.g., where a 9"×12" page should be cut to create an 8.5"×11" page, as described above). In one embodiment, the imposition module takes into account particular properties of the input VPML, such as facing pages, duplexing, and/or bleeds.

Generation module—The generation module 340 takes as input VPML code and produces (outputs) a set of commands in a page description language (such as PostScript or PDF). In one embodiment, the production process includes output level variables (such as output device type for a PostScript string) and/or caching. The generation module 340 will be further discussed below in conjunction with FIG. 4.

Parsing module—The parsing module 350 takes as input VPML code in text string format and generates a Document Object Model (DOM) data structure based on the VPML code. In one embodiment, a module that processes input VPML code (such as the substitution module 310, the composition module 320, or the imposition module 330) uses the parsing module 350 to generate a DOM based on the input VPML code. The module then manipulates the DOM rather than the VPML string. VPML code embodied in a DOM can be manipulated more easily than VPML code represented as a text string.

Image processing module—The image processing module 360 determines various properties of an image, such as height, width, resolution (e.g., dots-per-inch or "dpi"), or number of color channels. These properties are used by the generation module 340 in order to specify graphical output. In one embodiment, the image processing module modifies an image to resize it and/or change its format. For example, the image processing module converts Encapsulated PostScript (EPS) files or Joint Photographic Experts Group (JPEG) files to PDF format. In another embodiment, the module edits an EPS file programmatically in order to change colors. For example, at the time of printing, the module replaces a specific color value within an EPS file with a value based on a VPML element attribute entitled "substitution" (see Appendix A). In one embodiment, the replacement value is based on the style or color of the document.

Division module—The division module 370 divides content (as embodied by VPML code) into multiple sections based on dimensions and positions. In one embodiment, the division module divides content into two pieces based on the size of the section where the content is intended to flow. The first piece fits the dimensions of the section. The second piece is the remainder of the content that does not fit into the section.

Calculation module—The calculation module 380 determines the dimensions and positions of content (represented by VPML elements). These values are used by the generation module 340 in order to specify graphical output.

The functionalities of these modules can be combined to accomplish various tasks. For example, given a piece of content (VPML code), the calculation module 380 can be used to determine the height of that content once it is placed in an area of a particular width. As another example, the calculation module 380 and the division module 370 can be used to determine how much content can fit in an area of a particular size (width and height) and how much would be left over.

In one embodiment, the document processor 210 also includes specialized font handling capabilities (see Appendix A).

Figure 4:
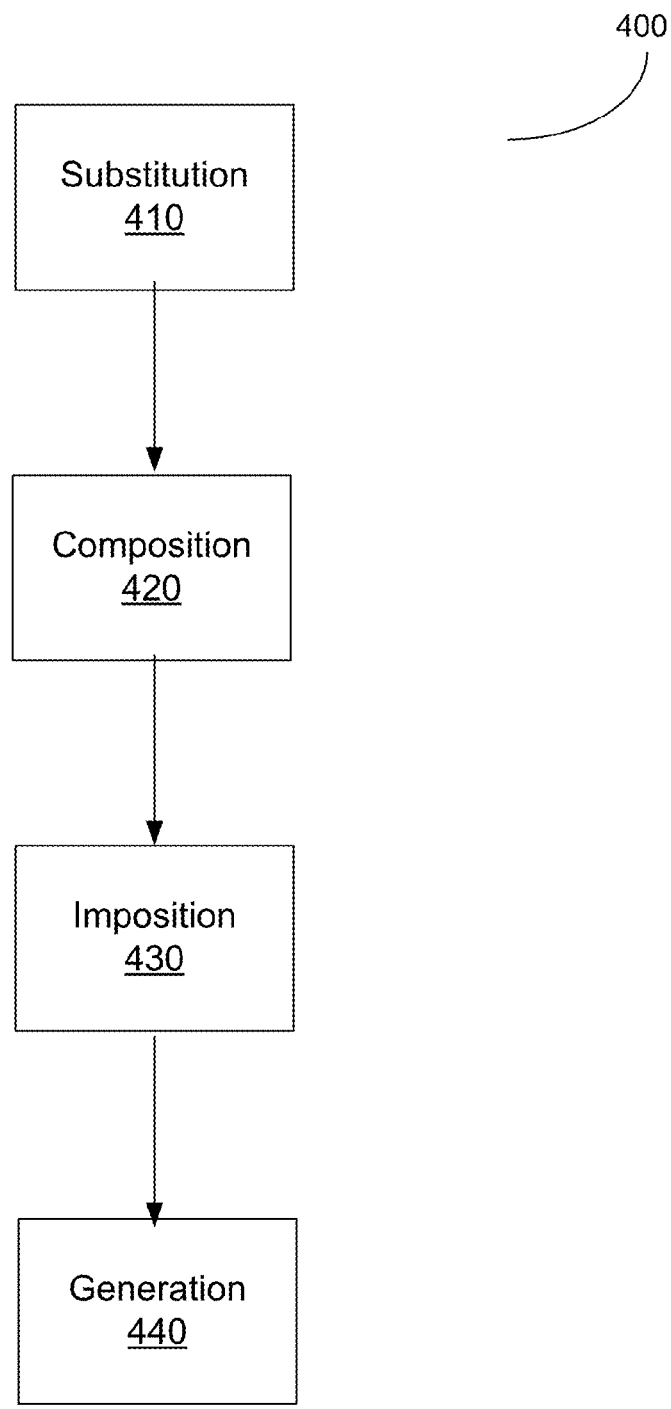
FIG. 4 illustrates a flowchart of a method performed by a document processor, according to one embodiment of the invention.

FIG. 4 illustrates a flowchart of a method performed by a document processor, according to one embodiment of the invention. The input to the method 400 is VPML code (such as the document portion of a packet 130). The output of the method 400 is an electronic file that describes a document using a page description language (PDL). In one embodiment, the PDL is PostScript® 3™ or PDF.

The first step of the method 400 is substitution 410. The control module 300 passes the input VPML to the substitution module 310. The substitution module 310 processes the input VPML based on the substitution tags (if any) and outputs VPML. The next step is composition 420. The control module 300 passes the VPML output by the substitution module 310 to the composition module 320. The composition module 320 processes the VPML based on the composition tags (if any) and outputs VPML. The next step is imposition 430. The control module 300 passes the VPML output by the composition module 320 to the imposition module 330. The imposition module 330 processes the VPML based on the imposition tags (if any) and outputs VPML. The final step is generation 440. The control module 300 passes the VPML output by the imposition module 330 to the generation module 340. The generation module 340 uses data obtained from the image processing module 360 and the calculation module 380 to generate and output a PDL file, such as PostScript or PDF.

C. Levels of Variability

A document processor 210 enables the generation of documents that are based on variable content and/or variable layout. For example, varying the operation of a module (e.g., via input parameters in the form of VPML tags) enables the generation of documents that are based on variable content and/or variable layout. Also, the substitution module 310 in particular enables the generation of documents through its conditional logic and variables.

In one embodiment, a business application 110 enables the generation of documents that are based on variable content and/or variable layout. For example, the document portion of a packet 130 includes (or references, e.g., contains a pointer to) the actual content and actual layout that are used to generate the final document. In this embodiment, the "variable" nature of the document (whether it concerns the document's content or layout, or both) is primarily embodied in the packet 130 that is generated by the business application 110. For example, the business application 110 includes logic that enables it to generate a packet 130 with different content and/or layout. The determination as to which content and layout is used in the packet 130 is based on, for example, user input or pre-specified defaults.

In one embodiment, image overlay enables the generation of documents that are based on variable content and/or variable layout. For example, a first image file contains static content (i.e., content that does not vary across documents). A second image file contains variable content (i.e., content that does vary across documents). Multiple "second" image files would exist, where each file specifies an image of the variable content for one document. A document is generated by using the image from the first file as a "base" and overlaying on top of it the image from one of the "second" files. The image from the first file specifies an area of a fixed size and position that is left blank in order to accommodate the image from the second file. In this way, the first file is used repeatedly with different sets of variable content (as embodied in the "second" files). In one embodiment, the first file is cached in order to improve performance (e.g., a printer caches the first file in order to increase printing speed).

In one embodiment, the first image file and the second image file(s) are written in PostScript. The first image file and a second image file are concatenated to form one PostScript file that describes the resulting document. In one embodiment, the first file is created by inputting VPML code into the document processor 210. The VPML code is written manually or generated by using a business application 110.

Image overlay is further described in the Data Document section of Appendix A. This approach is used in the mail distribution utility 120, where the varying content is the mailing addresses. This approach is also used in the Notices example (see below), where the varying content is specific to a living unit such as an apartment or condominium.

Thus, many mechanisms exist to generate documents that are based on variable content and/or variable layout. Which of these mechanisms are most suitable will depend on the specific situation. Mechanisms differ in terms of the amount of variability and flexibility that they offer. Also, mechanisms operate at different times during the publishing process, and the variable data may or may not be available at those times.

D. Control Logic

As described above, the control logic 200 generates a deliverable document using the document processor 210. The control logic 200 also distributes the deliverable document based on the packet 130 (specifically, based on the distribution portion of the packet 130).

In one embodiment, each distribution method is embodied in the control logic 200 within the distribution utility 120. The control logic 200 generates a copy of a particular document using the document processor 210 and also distributes the copy. In one embodiment, the control logic 200 performs one or more of the following: verify and assemble content; integrate content with stored resources; format content into modules, pages, documents, and volumes; determine, optimize, and manage output (format) and delivery (distribution) requirements; and logging (create audit log, document archive, and management report; track progress of document).

In one embodiment, the various control logics 200 function as follows:

Save logic—The save control logic 200 determines the desired format for the deliverable document based on the accompanying data in the distribution portion of the packet 130. If the desired format is PostScript or PDF, the logic uses the document processor 210 to generate the PostScript or PDF. If the desired format is something else, the logic uses the document processor 210 to generate PostScript or PDF and then converts the PostScript or PDF to the desired format. The logic then saves the file to the desired location based on the accompanying data in the distribution portion of the packet 130.

Email logic—The email control logic 200 determines the desired email address for the deliverable document based on the accompanying data in the distribution portion of the packet 130. The logic then emails the document to the desired address. In one embodiment, the logic uses an automated email software application such as Secure iNet Factory (from JSCAPE of Mesa, Ariz.) or the JavaMail API package, which is part of the Java Platform, Enterprise Edition (JavaEE) (from Sun Microsystems, Inc. of Santa Clara, Calif.). In one embodiment, the software application is accessed by using the <cfmail> tag within the ColdFusion Markup Language (CFML) of the ColdFusion MX 7 programming language (from Adobe Systems Incorporated of San Jose, Calif.) to email the deliverable document. The deliverable document is generated in the desired format in a similar manner as performed by the save logic. In one embodiment, if the email is returned (e.g., because it is not deliverable), the email logic is notified and can take further action (e.g., notify a user or software application or try a different distribution method).

Fax logic—The fax control logic 200 determines the desired fax number for the deliverable document based on the accompanying data in the distribution portion of the packet 130. The logic then faxes the document to the desired number. In one embodiment, the logic uses an automated fax software application such as Internet Fax (from Venali, Inc. of Coral Gables, Fla.), RightFax (from Captaris, Inc. of Bellevue, Wash.), or Fax On Demand (from AirComUSA of Provo, Utah) to fax the deliverable document. The deliverable document is generated in a format that is supported by the automated fax application in a similar manner as performed by the save logic. In one embodiment, the format is a page description language (e.g., PDF) or an image file (e.g., TIFF). In one embodiment, if the fax is returned (e.g., because it is not deliverable), the fax logic is notified and can take further action (e.g., notify a user or software application or try a different distribution method).

Print logic—The print control logic 200 uses the document processor 210 and the packet 130 to determine instructions to send to various output devices such as printers, distillers, and decomposition services. The devices operate in accordance with the instructions to generate various hard copy materials. In one embodiment, these materials are subjected to various finishing processes such as cutting, folding, boxing, and labeling. The print logic will be further discussed below.

Ship logic—The ship control logic 200 determines the desired shipping address for the deliverable documents based on the accompanying data in the distribution portion of the packet 130. The logic then generates a shipping label that can be affixed to a box of deliverable documents. The deliverable documents are generated in a similar manner as performed by the print logic. In one embodiment, the ship logic analyzes the desired shipping address (e.g., to confirm that it is valid) before generating the shipping label. In one embodiment, if the address is invalid, the ship logic is notified and can take further action (e.g., notify a user or software application or try a different distribution method).

Mail logic—The mail control logic 200 determines the desired mailing addresses for the deliverable documents based on the accompanying data in the distribution portion of the packet 130. Consider a document that has multiple versions, where different versions are sent to different addresses. Initially, one packet 130 exists for each version of the document. This packet 130 describes the document and the mailing addresses to which it should be sent. The mail logic removes the addresses from the various packets 130 and sorts them based on postal route (e.g., using a software application such as AccuZIP6, from AccuZip Inc. of Atascadero, Calif.). Then, the logic combines the different document versions and the sorted addresses into one large packet. This large packet is printed using the print logic. For each address, the correct document version is determined and printed using that address. The hard copy materials are thereby generated in postal route order. This way, the finishing process will produce deliverable documents in postal route order. In one embodiment, the mail logic analyzes the desired mailing addresses (e.g., to confirm that they are valid) before generating the deliverable documents. In one embodiment, if an address is invalid, the mail logic is notified and can take further action (e.g., notify a user or software application or try a different distribution method).

E. Print Control Logic

Recall that a packet 130 that specifies print as a method of distribution is referred to as a job. When this packet 130 is first received by the distribution utility 120, it is called a job request. After the request has been accepted by a queue, it is called a job. In one embodiment, the print logic determines to which device or queue a job request should be sent. This determination is made based on one or more factors such as physical location (e.g., of the device and/or of the ultimate recipient), functionalities (e.g., required by the job request and/or provided by the device/queue), and capabilities (e.g., throughput or latency of a device/queue).

As a job is being processed, it can reach various events or statuses. In one embodiment, the possible events/statuses include: created/requested (job has been created but not yet begun processing); started/in progress (distribution utility 120 has begun processing and fulfilling job); fulfilled/finished (job has been successfully fulfilled and completed); faulted/finished (job encountered problems during processing and could not be fulfilled); cancelled/finished (job was cancelled (aborted) before processing); and aborted/finished (job was aborted during processing before fulfillment was complete). In one embodiment, as a queue processes a job, it saves the job's status to memory or notifies a user or an application about the job's progress.

Print control logic 200 includes various modules, each of which is configured to provide a particular functionality. In one embodiment, the modules and their particular functionalities are as follows:

Job management module—A job management module manages the lifecycle of a job. In one embodiment, this includes processing a job until it is in printable form and then submitting it to an output device. In another embodiment, this includes providing notifications of a job's progress (e.g., to a user or to an interested application).

Device management module—A device management module manages the availability and feeding of output devices. In one embodiment, this includes using an output device to produce a document. A device can include one or more parameters (properties), such as IP address, username, password, and prompt. A device can include one or more queues or channels. A queue or channel can include one or more parameters (properties), such as name and output path. In one embodiment, a device is defined and/or configured by XML code.

User interface module—A user interface (UI) module enables a user, such as an administrator or a device operator, to view and/or modify job management and processing. In one embodiment, this includes controlling queues and/or output devices. In one embodiment, the UI is graphical and is web-based. For example, a user uses a web browser to communicate with a web server, and the web server sends the UI to the user in the form of a web page.

Services toolkit module—A services toolkit module provides various tools. In one embodiment, these tools are for decomposing ("decomping"), distilling, printing, logging, and database resource management.

Database module—A database module stores data and status information related to jobs, processes, and/or output devices.

3. Business Application

Figure 5:
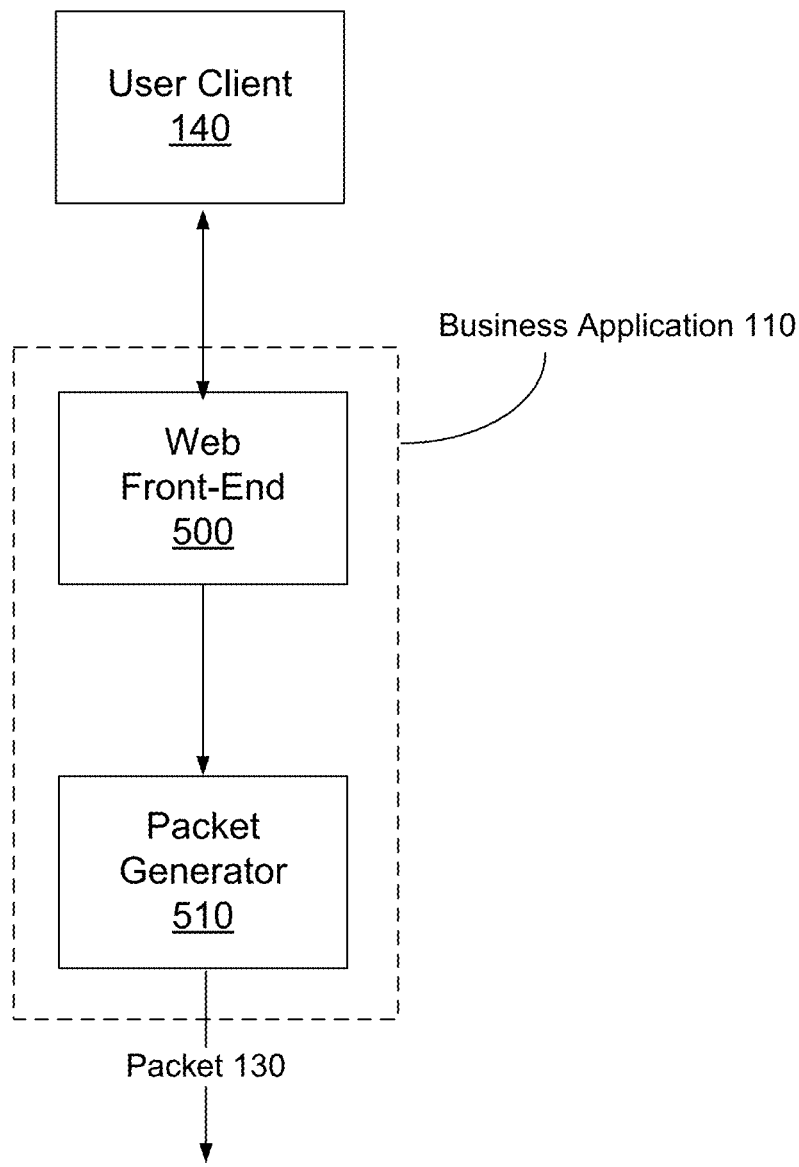
FIG. 5 illustrates a diagram of a generic business application, according to one embodiment of the invention.
Figure 6B:
Figure 6D:
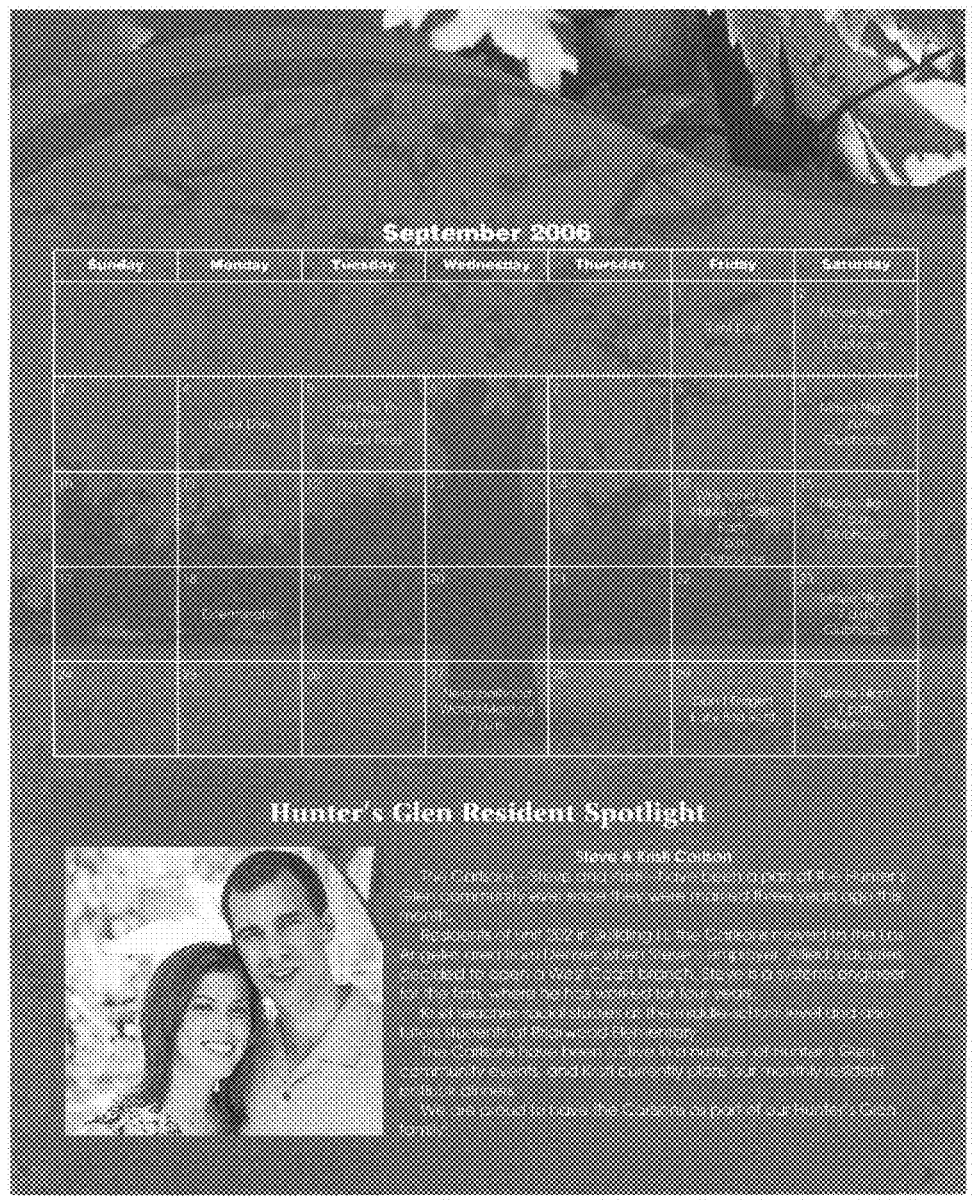
Figure 7:
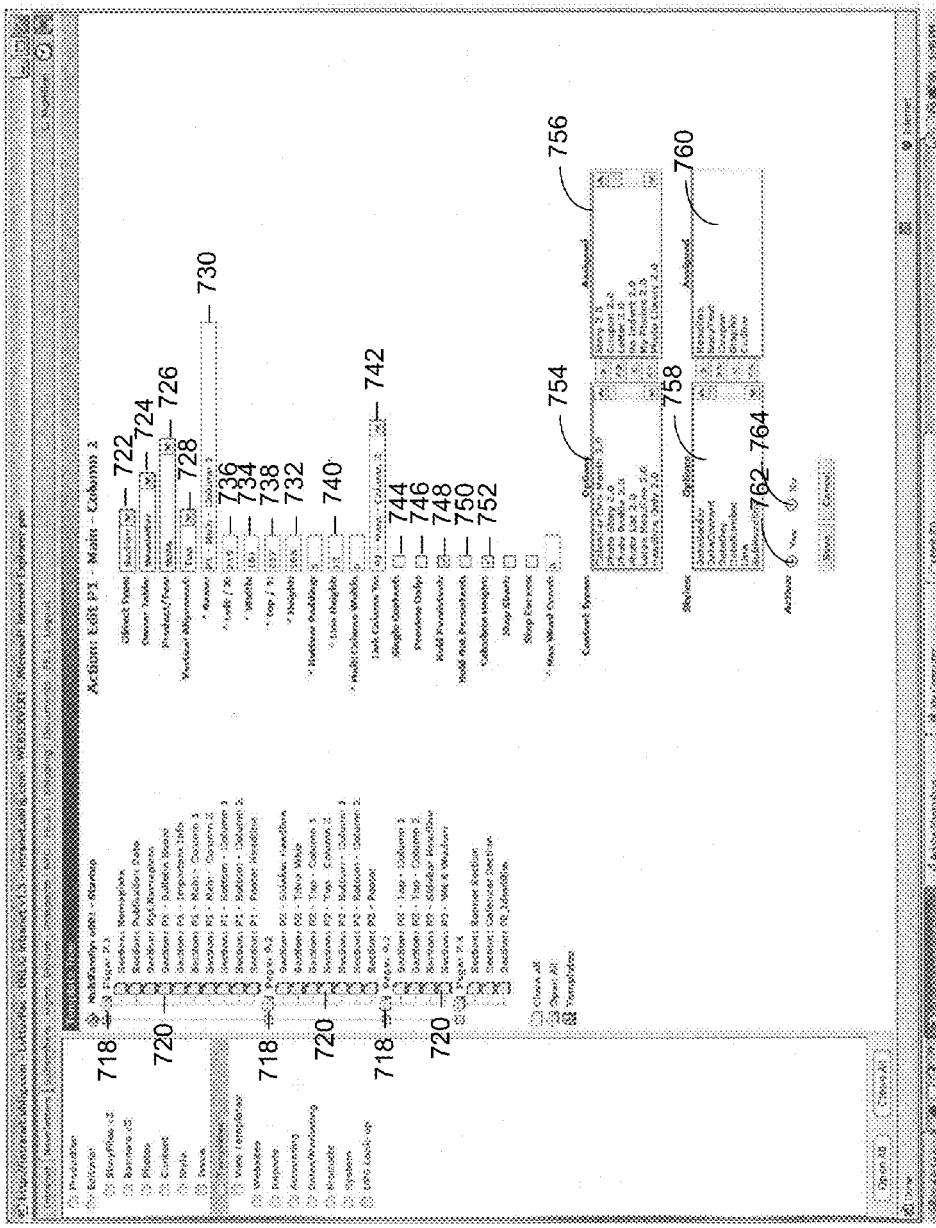
FIG. 7 illustrates a user interface for managing a Template Node Structure, according to one embodiment of the invention.
Figure 8:
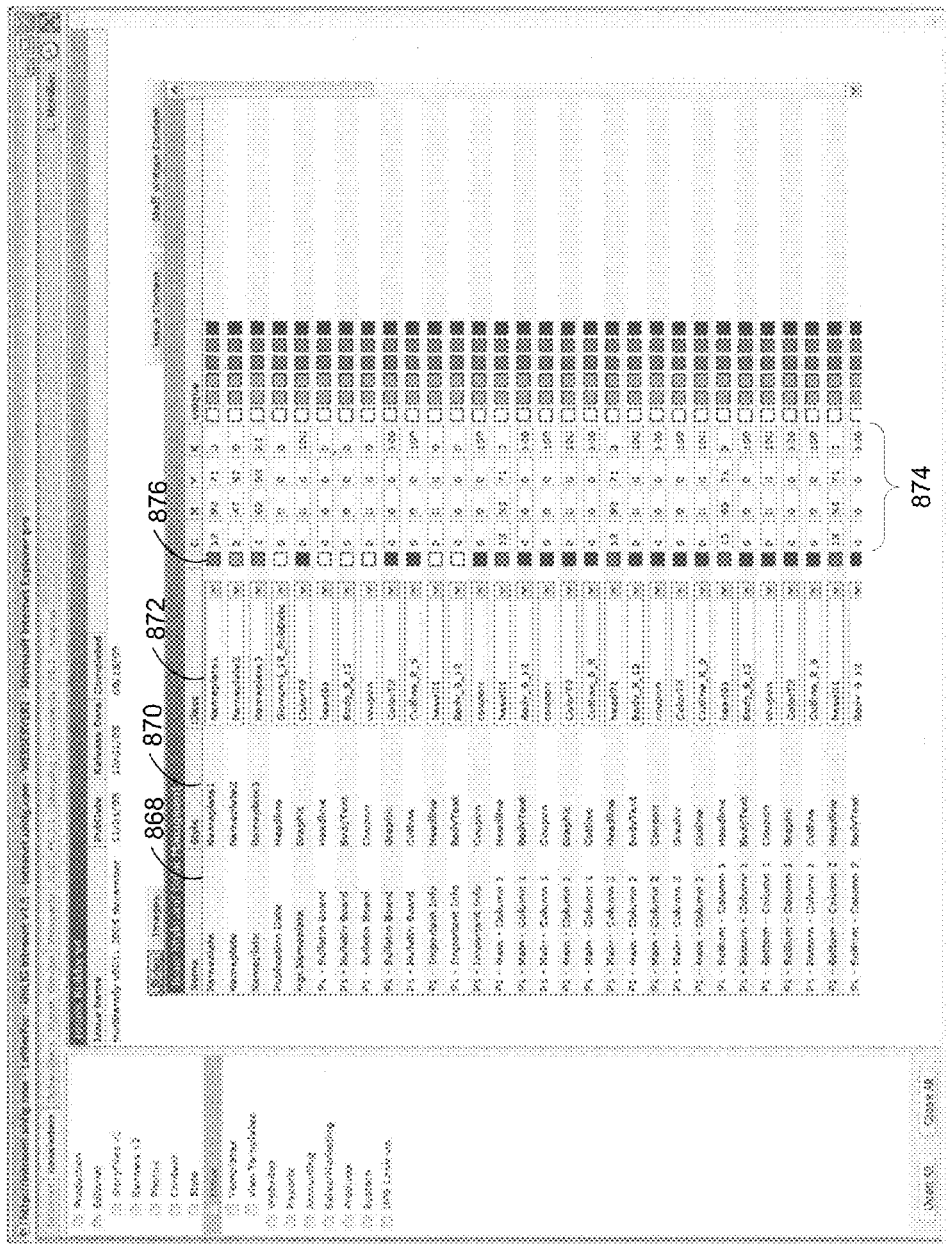
FIG. 8 illustrates a user interface for managing issue styles, according to one embodiment of the invention.
Figure 9:
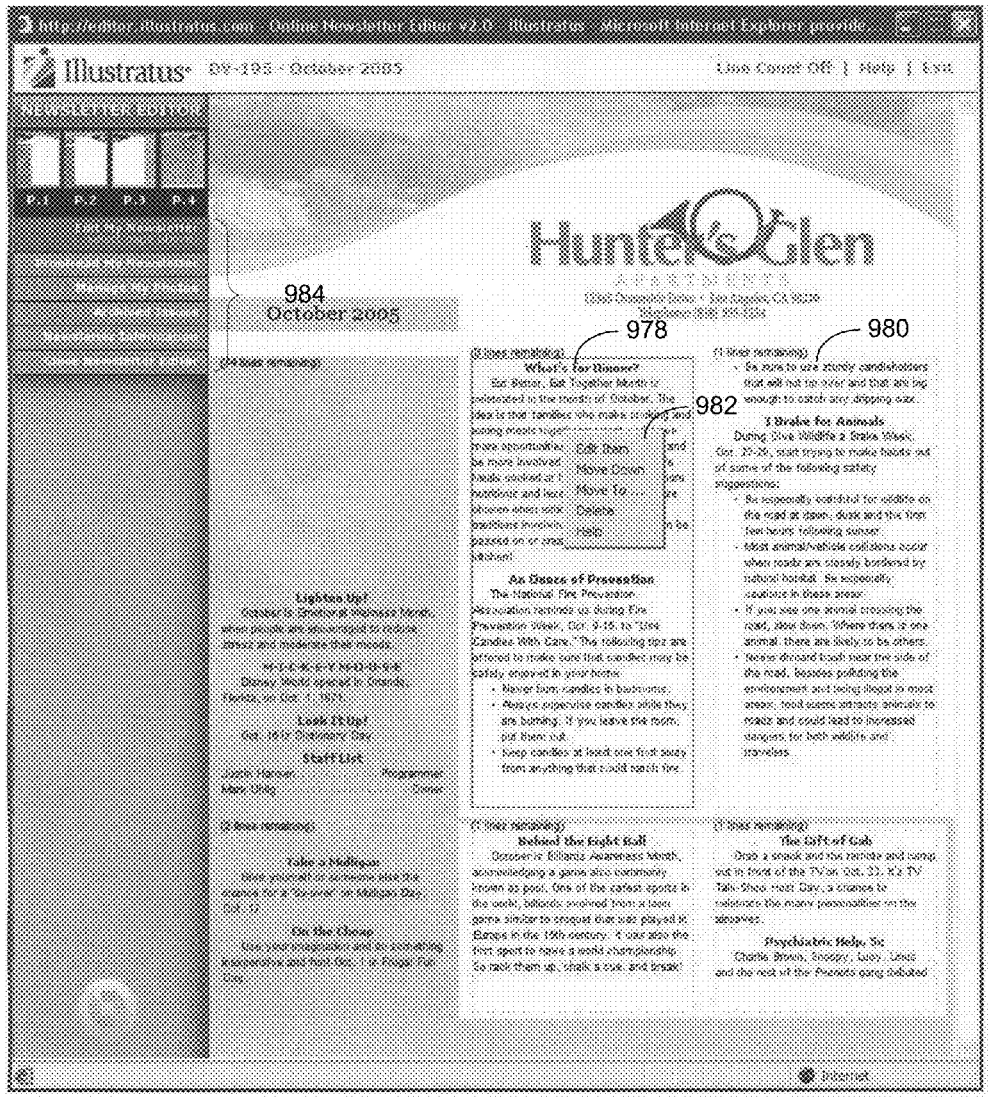
FIG. 9 illustrates a user interface of the editor, according to one embodiment of the invention.
Figure 10:
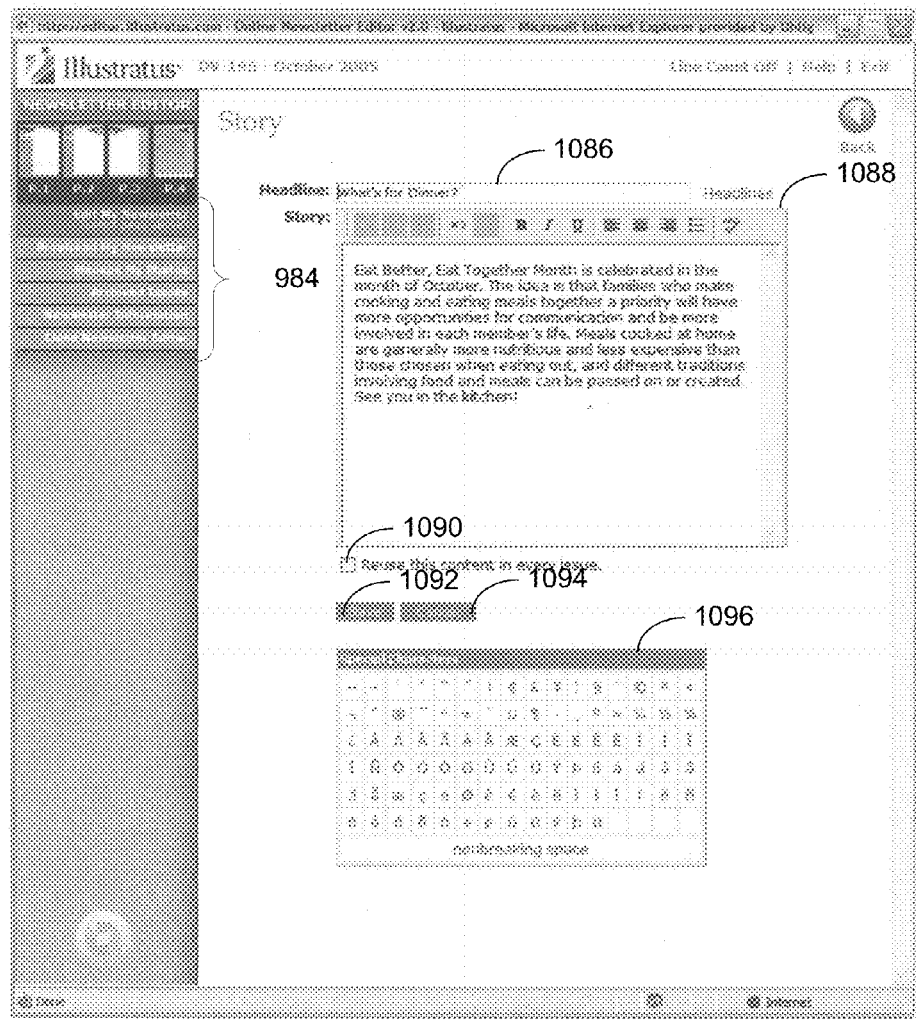
FIG. 10 illustrates a user interface of the editor to edit an item, according to one embodiment of the invention.
Figure 11:
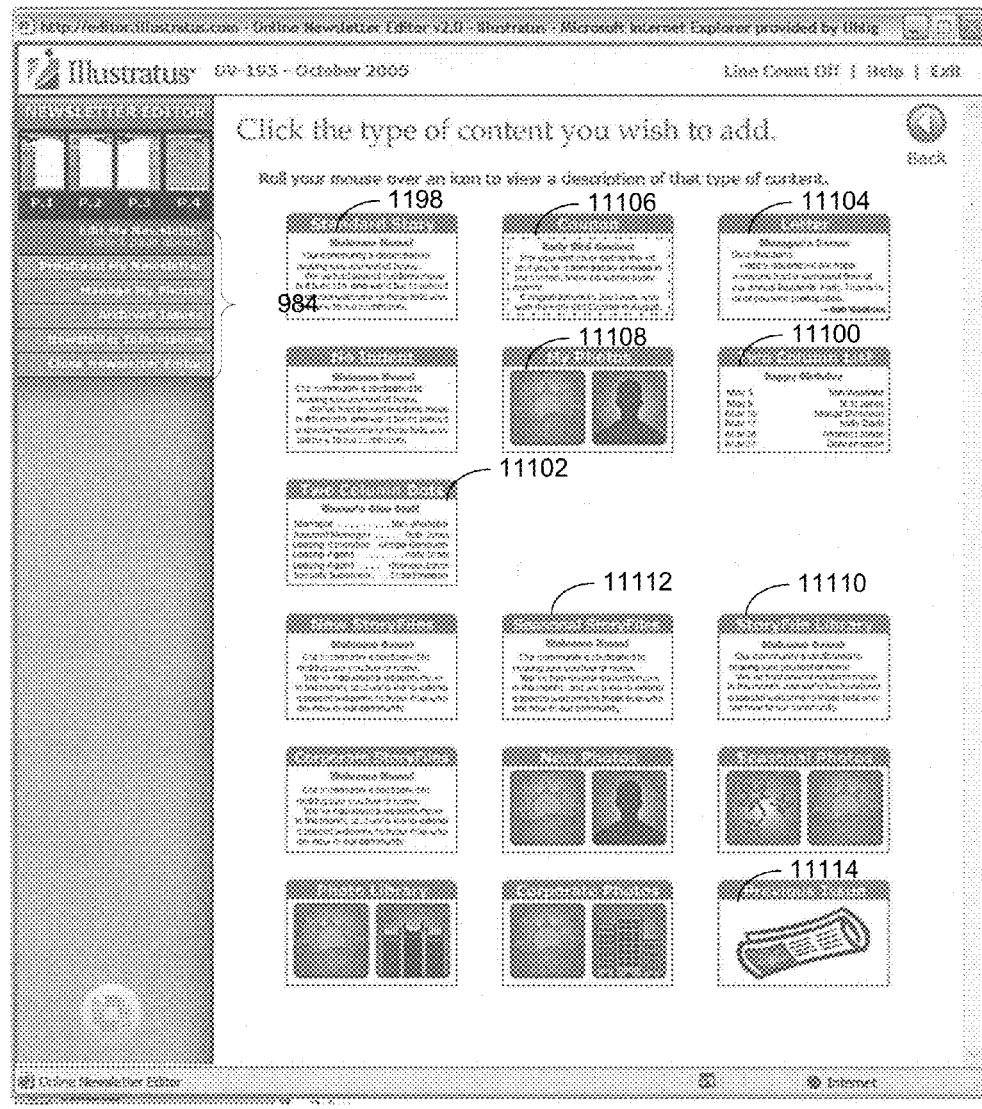
FIG. 11 illustrates a user interface of the editor to select a Content Module, according to one embodiment of the invention.
Figure 12:
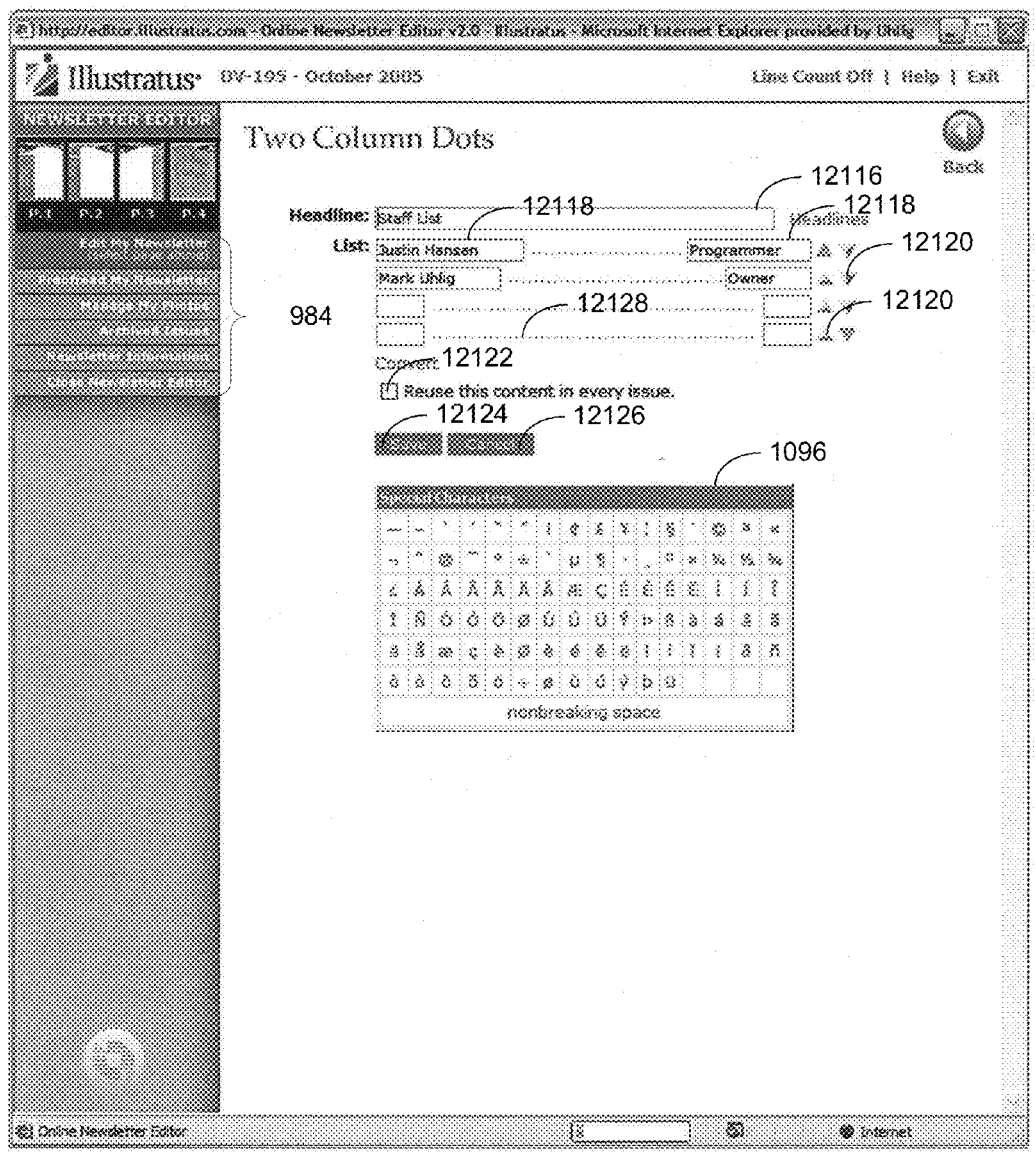
FIG. 12 illustrates a user interface of the editor to edit the contents of a Two Column Dots Content Module, according to one embodiment of the invention.
Figure 13:
FIG. 13 illustrates a user interface of a My Photos library of images, according to one embodiment of the invention.

FIG. 5 illustrates a diagram of a generic business application, according to one embodiment of the invention. In the illustrated embodiment, the business application 110 includes a web front-end 500 and a packet generator 510. The web front-end 500 and the packet generator 510 are communicatively coupled. The web front-end 500 enables a user to specify, via a web browser, a document and/or a distribution method. The packet generator 510 generates a packet 130 that is transmitted to the distribution utility 120.

The web front-end 500 enables user interaction via one or more user interfaces. In one embodiment, a user interface is graphical and comprises a web page that is viewed by a user via a web browser. For example, the web front-end 500 generates a web page and sends it to the user's computer. In one embodiment, the web page is generated automatically by a software application written using the ColdFusion MX 7 programming language (from Adobe Systems Incorporated of San Jose, Calif.) and/or the Java programming language (from Sun Microsystems, Inc. of Santa Clara, Calif.).

In one embodiment, a user interface enables a user to collect, edit, view, and/or manage content or templates. By using the user interface, a user can specify a document, which is eventually embodied in a packet 130. For example, a user selects a template and various content. These choices are saved in a data store. The packet generator 510 accesses the data store and generates a packet 130 based on the saved choices and/or based on other saved data such as templates (e.g., in a template library), content or resources (e.g., in a resource library), or other data (e.g., in a database or web service). The packet 130 is then sent to the distribution utility 120.

A. Exemplary Business Application—Magazines

In one embodiment, the business application 110 is designed for working with magazines. In this embodiment, the product creator 100 can be used to create and/or distribute magazines. As used herein, the term "magazine" refers generally to any type of periodical publication, including (but not limited to) a periodical publication, possibly issued at regular intervals, containing articles, stories, photographs, advertisements, and/or other editorial content; a product comprising a paperback periodic publication as a physical object; a publication that is issued periodically, possibly bound in a paper cover, and typically containing essays, stories, poems, photographs, drawings, etc., possibly specializing in a particular subject or area (such as hobbies, news, or sports); and a periodical publication containing a collection of articles, stories, pictures, and/or other editorial content.

Examples of a magazine include, but are not limited to, a newsletter, brochure, pamphlet, booklet, leaflet, periodical, issue, edition, volume, circular, report, guide, handbook, workbook, manual, journal, collection, series, tabloid, proof, glossy, monthly, quarterly, fanzine, newsmagazine, review, installment, supplement, and subscription.

In one embodiment, the business application 110 is designed for working with newsletters. A newsletter is a cyclical publication that is designed to communicate with a particular readership, such as residents of a particular geographic community, employees of a particular business, or clients, patients, or prospects of a particular professional. In one embodiment, a "community" is comprised of people with similar interests, hobbies, or areas of expertise. In another embodiment, a "community" is comprised of other similar audiences who are served by newsletters.

In one embodiment, the newsletters business application 110 includes three user interfaces. A first user interface enables a user to view and/or edit a newsletter via an editing application ("editor"). A second user interface enables a user (such as a newsletter customer like an apartment manager) to view production status or account information. A third user interface enables a user (such as a publishing administrator or operator) to manage production status or account information.

Consider, for example, how an Apartment Manager might use the product creator 100 to create and/or distribute a resident newsletter for an apartment community.

In the past, this Manager was left with few options for the creation of such a newsletter: hand-written or typed flyers; desktop publishing solutions that then had to be printed or copied in the company office or at a local copy center; or use of existing commercial newsletter services where monthly information had to be submitted by fax or, at best, typed into web forms that were then emailed. Use of existing commercial providers also meant either waiting for a "Proof" of the newsletter to be returned for approval or foregoing proofing altogether.

By using a product creator 100 that includes a business application 110 that is designed for working with newsletters, this process can change and be improved in several ways. The Manager could first contact the Newsletter Provider to set up a customer account. This contact might take place by telephone, over the Internet, through correspondence, or in a variety of other ways that could, for example, be completely automated. In setting up this account, the Manager would provide typical billing and shipping information, which could include: Company Name, Contact Name, Title, and Company Address (including City, State, and Zip). If the shipping or billing addresses differed from the aforementioned information, that fact could also be included in creating the customer record. The customer account record likely might also include such information as the quantity of newsletters to be produced and how and where they might be delivered.

In addition, during this set-up process, a representative of the Provider might create for the Manager an appropriate Login and Password; or creation of these elements might be an automated process. This Login and Password could then, for example, be used to access an interface that enables online creation of a newsletter.

The Manager, in this case using a computer with Internet access, could navigate using a Web browser to the correct URL address. (The Manager might also access the interface through a PDA, a cellular phone, or other device.) The Manager could then enter the assigned Login and Password in the appropriate fields so as to "sign on" to the customer's newsletter account.

Once signed on, the Manager might be able to execute a number of important functions, which could include, but would not be limited to: updating or changing basic account information (contacts, passwords, print quantity, etc.); reviewing or paying outstanding invoices; tracking the shipment or delivery of newsletters already created; and editing, previewing, and submitting new newsletters to be printed.

For this example, consider a case in which the Manager might use this version of the invention to execute the last of these functions: editing, previewing, and submitting a newsletter for production. Having already signed on, the Manager could select (e.g., using an input device such as a keyboard or mouse) an icon or similar text or graphic representation of a pre-designed newsletter template that is available to edit. Such an action might launch a user interface or "online editor" in the browser window that would allow the Manager to add or edit content in the newsletter template. This content could include, but would not be limited to: articles, photos, advertisements, staff listings, important phone numbers, office hours, seasonal messages (both text and graphics), customized calendars, or any other content the Manager wanted to communicate to residents of the apartment community.

In addition to creating or uploading original content, the Manager might be able to select from a resource library of prewritten articles and preloaded graphics or photographs to help fill the newsletter template. Assuming that the Manager is viewing a web-based representation of a newsletter, these actions would be accomplished by steps such as the following, which might be used to add an original article to the newsletter:

- select a section of the newsletter
- select the hot-link labeled "Add Item"
- select a hot-link icon for a content type, such as one labeled "Standard Story"
- enter a headline and article in the appropriate fields
- select "save"
- select "spell-check"
- select "done."

This process can be repeated. For example, a content item can be added to another section of the newsletter. As another example, an additional content item can be added to the current section.

Assuming that the Manager is viewing a web-based representation of a newsletter, to make use of the resource library of prewritten articles and preloaded graphics or photographs, the Manager might follow these steps:

- select a section of the newsletter
- select the hot-link labeled "Add Item"
- select a hot-link icon for the content type labeled "Story-File Library"
- find related prewritten articles (e.g., by browsing articles or by searching articles based on keyword, full-text, and/or category)
- select the desired article to insert it into the newsletter.

This same process could be used to create original content or to make use of the resource library of prewritten articles and preloaded graphics or photographs until the newsletter was complete.

During the creation process, line counts might be available at the top of each newsletter section to indicate how many lines of content were still available in the section. At any point in the creation of the newsletter, the Manager could select "Proofread My Newsletter" and be presented with an online PDF proof of the newsletter to quickly and easily know how it would look in print.

Once the Manager was satisfied with the newsletter, it could be submitted by selecting the "Submit My Newsletter" icon. Upon performing this action, the Manager might be presented with a summary of the newsletter that might include, but would not be limited to: indications as to whether too much or too little content had been included in any given section, an estimated invoice total, a copy of subscriber Terms and Agreements, and an option to have any remaining space filled with prewritten editorial content. Estimated delivery information might also be presented, along with instructions for contacting Customer Support with any additional questions or concerns.

Once the newsletter had been submitted by the Manager, the formatted content in the newsletter template from the online editor could be converted by a distribution utility and document processor into printed output. One form of this printed output might be a grayscale (black and white) rendering of the newsletter to be used for proofing by the Provider's proofreading staff.

Once any changes or corrections had been made to the original submitted newsletter, the distribution utility and document processor might create the final, high-resolution, full-color PostScript file to print the correct quantity of newsletters on a high-end, digital printing device.

These printed newsletters might be subjected to various finishing processes (cutting, folding, boxing, labeling) and then could be shipped in finished form to the Apartment Manager for distribution. Alternately, the newsletters could be addressed individually for postal delivery to each apartment (e.g., using the mail distribution utility).

In this example, the Apartment Manager would have made use of one embodiment of the invention to quickly and easily create a community newsletter using a process that enabled online WYSIWYG (what you see is what you get) editing and quick and easy previewing of what the finished product would be.

FIGS. 6A-6D each illustrate one page of a newsletter, according to one embodiment of the invention. This newsletter was created using a product creator 100 that included a newsletters business application 110 and a save distribution utility 120.

An exemplary business application 110 that is designed for working with magazines is further described in Appendix B.

B. Exemplary Business Application—Resale Documents

In one embodiment, the business application 110 is designed for working with resale documents. In this embodiment, the product creator 100 can be used to create and/or distribute resale documents. In one embodiment, resale documents are documents required for the transfer, sale, and/or purchase of a residential home. For example, in certain states (e.g., Arizona, Pennsylvania, Virginia, and Nevada), a seller of a home within a certain managed community is required by law to provide a buyer a complete set of specified disclosure documents in order to complete the sale of the home. In one embodiment, resale documents are full-color customized packages containing static documents and/or documents that are based on variable content and/or variable layout.

In one embodiment, the resale documents business application 110 includes three user interfaces. A first user interface enables a user (such as a customer of a residential property management company) to place an order for resale documents, pay for the order, track the status of the order, and receive the order in time for the closing of the sale. A second user interface enables a user (such as a management company employee) to manage and monitor the resale document order system and to provide data. A third user interface enables a user (such as a publishing administrator or operator) to create and configure resale document formats, add new data to include in the resale documents, and manage production status or account information.

Consider, for example, how an Agent working for a Title Company might use the product creator 100 to order documents required to close the sale of a home.

In the past, this Agent was required to create and/or complete forms manually to request the required documents from a residential property management company. Once the request was received, the Agent had to wait for the required documents to be manually created, completed, and/or duplicated and sent back to the Agent before the sale of the home could close.

By using a product creator 100 that includes a business application 110 that is designed for working with resale documents, this process can change and be improved in several ways. The Title Company Agent could first contact the Provider through a property management company to set up a customer account. This contact might take place by telephone, over the internet, through correspondence or in a variety of other ways that could, for example, be completely automated. In setting up this account, the Agent would provide typical billing and shipping information, which could include: Company Name, Contact Name, Title, and Company Address (including City, State, and Zip).

In addition, during this set-up process, a Login and Password would be created for the account, which could also be a completely automated online process. This Login and Password could then, for example, be used to access an interface that is a part of this version of the invention that allows the Agent to place an order requesting certain documents required for closing the sale of a home. Those documents could include, but would not be limited to, a Resale Certificate and Resale Documents from a Property Management Company and/or Homeowners Association to which the property was attached.

The Agent, in this case using a computer with Internet access, could navigate using a web browser to the correct URL address. (The Agent might also access the interface through a PDA, a cellular phone, or other device.) The Agent could then enter the assigned Login and Password in the appropriate fields so as to "sign on" to the Title Company's account.

Once signed on, the Agent might be able to execute a number of important functions, which could include, but would not be limited to: updating or changing basic account information; reviewing or paying outstanding invoices; tracking the shipment or delivery of documents already requested and created; and placing new orders or document requests.

For this example, consider a case in which the Agent might use this version of the invention to execute the last of these functions: placing a new order for documents required to close the sale of a residential home. In this example, these documents include a Resale Certificate and a set of the appropriate Homeowners Association Documents Having already signed on, the Agent could navigate using simple mouse clicks to the appropriate web form for submitting a resale document order. (In the alternative, the Agent might also be able to download printable forms to fill out and submit by mail or fax if that was the preferred method.) If completing the order online, as in this example, the Agent would provide the required information pertaining to the sale of the home by entering data through a web-based wizard. This data might include, but would not be limited to, the exact physical address of the property, name(s) of the seller(s), name(s) of the buyer(s), purchase price, and scheduled closing date.

Based on pricing set by the Property Management Company and perhaps depending upon the turn-around time required for the order, the Agent could then pay for the document order via a variety of options while online: credit card, electronic check, through a corporate account previously set up by the Title Company, or with a Coupon Code generated by the Provider and supplied to the Title Company. In the alternative, the Agent could mail a paper check to the Property Management Company to pay for the order. Once payment for the order was received, the resale document order might then be scheduled for fulfillment by the Provider.

If required (according to settings used when the property was originally registered with the Provider by the Property Management Company), notification of the pending sale might be sent via electronic mail to such entities as an inspector, a manager, a Property Management Company, or the Title Company. Various pieces of data pertaining to the designated property might be provided by any of those entities until all information required to produce the requested resale documents had been compiled.

In this exemplary embodiment of the invention, the Provider might combine the variable data provided by the above-mentioned entities to produce through a distribution utility a Resale Certificate, which might include, but would not be limited to, such pertinent information as the name(s) of the current owner(s), the address of the property, the Homeowners Association to which the property is attached, any account balance the current owner(s) might have with the Property Management Company, Special Assessments or Maintenance Fees associated with the property, and when and to whom those fees might come due.

In the alternative, the Document processor could also produce a PDF version of the Resale Certificate, which could then be sent via electronic mail or fax to the Agent.

The Provider might also use a resource library of pre-scanned documents to produce the appropriate Homeowners Association documents requested in the order. These documents might include, but would not be limited to, Homeowners Association Bylaws, Articles of Incorporation, Declarations, and Rules and Regulations.

These documents might all be contained in a comprehensive Resource Library of community documents. To create this library, each community (through the Property Management Company) might submit the appropriate documents attached to the community. The documents might be scanned, cleaned, and put through a rigorous quality control process whereby a community manager might provide final approval for the appropriate set of community documents, which then would become the "official" set of static documents attached to the community.

Triggered by the property address, which the Property Management Company would have registered with the Provider, the appropriate Homeowners Association documents might be compiled from the resource library database, along with pertinent variable information provided on the web-based interface or data retrieved externally from the Property Management Company, and converted by the distribution utility to produce one or more full-color, fully customized perfect-bound books to be provided to the Buyer(s) before the closing of the sale of the residential home.

In this example of one embodiment of the invention, a complete custom-printed package would be delivered to the Agent of the Title Company that might include, but would not be limited to, a folder containing the Resale Certificate and any pertinent Property Management Company or Homeowners Association documents that require signatures at closing and the perfect-bound book(s) containing pertinent documents from the appropriate Homeowners Association, thus fulfilling the order placed by the Agent.

In this example, the Agent would have made use of one embodiment of the invention to quickly and easily place an order for documents required to close the sale of a residential home, made payment for the order, and then received those documents in a handsome, full-color customized package in time for the closing of the sale.

An exemplary business application 110 that is designed for working with resale documents is further described in Appendix C.

C. Exemplary Business Application—Notices

In one embodiment, the business application 110 is designed for working with notices. In this embodiment, the product creator 100 can be used to create and/or distribute notices. In one embodiment, notices are cyclical notices (e.g., fire safety plans, window guard notices, and lead-based paint notices) that are statutorily required to be distributed to occupants of units in some communities in certain municipalities. For example, New York City requires such notices under Local Law 1 of 2004 (the NYC Childhood Lead Poisoning Prevention Act of 2003); 3 RCNY (Rules of the City of New York) §43-01 (Residential Fire Safety Plans and Notices); and Window Guard Regulations of the City of NY 6-30-01 §12-03.

In one embodiment, the notices business application 110 includes two user interfaces. A first user interface enables a user (such as a management company) to create notices. A second user interface enables a user (such as a publishing administrator or operator) to create notice formats, add new data to include in the notices, and manage production status or account information.

Consider, for example, how a Property Management Company in charge of a multifamily residential building in a city that statutorily requires notices might contract with an outside company (the Provider) to fulfill this requirement for distribution and tracking of Annual Notices and use the product creator 100 along the way.

In the past, a Property Management Company would have been forced to produce multiple copies of Annual Notices, see that they were delivered to the appropriate units (usually by hand), collect responses and tally results by hand, and then follow up on required actions to attempt to remain in compliance with prevailing statutes. This task was often accomplished by hiring seasonal or part-time help.

By using a product creator 100 that includes a business application 110 that is designed for working with notices, this process can change and be improved in several ways. The Property Management Company might register or set up its building with the Provider, supplying a comprehensive listing of each unit's exact postal address. As part of this building set up, the Property Management Company might also indicate which of the available Annual Notices should be sent.

These Notices might include, but would not be limited to, notices regarding a fire-safety plan, including information about sprinkler systems, fire alarms, and means of egress; notices regarding window guards; and notices regarding lead-based paint. Any or all of these notices, or others, might be required by federal, state, or municipal laws.

Once the set up of the building was complete, and taking into account the timing required by any governing statutes, the Provider might create completely customized Annual Notices for each unit within the building managed by the Property Management Company.

To accomplish this task, the business application might use the variable data in the Provider's database (entered during building set-up) or data retrieved externally from the Property Management Company, in combination with pre-created documents in the Resource Library.

From this combination of resources, as translated by the distribution utility, a multi-page booklet might be created for each unit within the building. This booklet might include, but would not be limited to:

A) Any verbiage or graphics required by statute, including municipal seals or signatures.

B) A letter from the Property Management Company (including the company logo, if any) explaining the contents of the booklet and the action, if any, that might be required from the occupant(s).

C) A Fire Safety Plan, including information, if available, about the building construction, sprinkler system, fire alarms, speaker system, and the best means of egress from the apartment, the floor, and/or the building in case of a fire.

D) Window Guard Notices, inquiring as to whether any occupants of the unit are under a certain age and whether window guards need to be installed and/or repaired.

E) Lead-Based Paint Notices, inquiring as to whether any occupants of the unit are under a certain age, which might subsequently trigger requirements for peeling paint inspections. Lead-based paint notices might automatically be generated for those buildings constructed before a certain year.

In addition, these notices might contain several other features, including, but not limited to: translations of the information into Spanish and/or other languages and perforated, detachable return postcards for occupants to record their required responses to inquiries about window guards and/or lead-based paint.

For the first round of notifications, the Provider might mail to each individual unit the appropriate Annual Notice booklet. Some occupants might then detach the included return postcard, complete the required information and/or acknowledgements, and mail the pre-addressed postcard back to the Provider. The postcard might be imprinted with a unique, unit-specific bar code, enabling it to be automatically recorded for the proper unit.

These responses might then be scanned, recorded, and included in online response-tracking reports accessible to the Property Management Company. Images of the actual return postcards might be kept as permanent records for the Property Management Company.

It is likely that not all occupants would respond to the first round of Annual Notices. Therefore, at a date determined by either statute or the Property Management Company, the Provider might initiate a second round of notification, sending another copy of the Annual Notice booklet to those addresses where no response was recorded or the response received was unclear or incomplete.

In addition, the Property Management Company might receive a report of all non-responding units. Responses from the second round of notifications would also be scanned, recorded, and included in online response-tracking reports accessible to the Property Management Company.

At this point, the Provider might create a third series of postcards to be used to help bring the building to 100 percent compliance. The business application would use the variable data in the Provider's database (entered during building set-up and recorded responses to the two rounds of notifications) or data retrieved externally from the Property Management Company, in combination with pre-created documents in the Resource Library, to create a packet to send to the distribution utility to produce a series of postcards that might be sent directly to the Property Management Company or to a building manager or superintendent.

This third set of postcards would include a pre-addressed return postcard for all non-responding units so that the Manager or Superintendent might go door-to-door to complete the required information and then send the card back to the Provider.

In addition, a postcard might also be created for a unit where action was required to bring the unit into compliance (e.g., the installation or repair of window guards). This pre-addressed return card might provide an area for the building representative to indicate that the required action had been taken and could then be sent back to the Provider.

Responses from this third round of postcard notifications might then be scanned, recorded, and included in online response-tracking reports accessible to the Property Management Company, enabling the company to monitor the process and ensure that the building attained 100 percent compliance or the level of compliance required by statute.

In this example, the Property Management Company would have made use of one embodiment of the invention to more quickly and easily create and distribute Annual Notices that the law required be sent to occupants of its building. In addition, it would have made use of online reports to track responses to the notifications and would have received notification of those units where responses were not recorded and/or units where action was required to bring the units into compliance with prevailing statutes.

4. Additional Embodiments

Although the invention has been described in considerable detail with reference to certain embodiments thereof, other embodiments are possible as will be understood to those skilled in the art.

What is claimed is:

1. A computer program product for generating a representation of a document from eXtensible Markup Language (XML) code describing the document, comprising:
   a computer-readable storage medium; and
   instructions encoded on the computer-readable storage medium that, when executed by a processor, cause the processor to:
     substitution-process the XML code describing the document to generate substitution-processed XML code, wherein substitution-processing comprises:
       identifying, within the XML code describing the document, a conditional logic portion that comprises an expression and data;
       determining a Boolean value of the expression;
       modifying, if the determined value is "true," the XML code describing the document by replacing the conditional logic portion with the data; and
       modifying, if the determined value is "false," the XML code describing the document by removing the conditional logic portion;
     composition-process the substitution-processed XML code to generate composition-processed XML code, wherein composition-processing comprises:
       identifying, within the substitution-processed XML code, content that is to be flowed;
       identifying, within the substitution-processed XML code, a template through which the identified content is to be flowed;
       determining whether the identified content fits within one instance of the identified template; and
       modifying, if the identified content does not fit within one instance of the identified template, the substitution-processed XML code to specify an additional instance of the identified template;
     imposition-process the composition-processed XML code to generate imposition-processed XML code, wherein imposition-processing comprises:
       identifying a code portion within the composition-processed XML code that is specified as being a logical page;
       identifying a requested physical page size that represents a physical sheet of material; and
       modifying the composition-processed XML code to implement the requested physical page size by specifying one or more physical pages, wherein a physical page includes multiple logical pages, and wherein modifying the composition-processed XML code comprises changing a position of a  tag within the composition-processed XML code; and
     generate, based on the imposition-processed XML code, the representation of the document using a page description language.

2. The computer program product of claim 1, wherein substitution-processing further comprises:
   identifying, within the XML code describing the document, a variable;
   determining a value of the variable; and
   modifying the XML code describing the document by replacing the variable with the determined value.

3. The computer program product of claim 2, wherein the determined value comprises one element of a group containing document content information, XML code, an image, document layout information, and a template.

4. The computer program product of claim 1, wherein composition-processing further comprises:
   identifying, within the substitution-processed XML code, a second set of content that is to be repeated when a flow occurs; and
   modifying, if the identified content does not fit within one instance of the identified template, the substitution-processed XML code by adding the identified second set of content.

5. The computer program product of claim 1, wherein composition-processing further comprises modifying, if the identified content does not fit within one instance of the identified template, the substitution-processed XML code to specify that the identified content will be placed within the additional instance of the identified template.

6. The computer program product of claim 1, wherein imposition-processing further comprises determining a size of a spine of a book based on a number of pages within the book.

7. The computer program product of claim 1, wherein imposition-processing further comprises modifying the composition-processed XML code to specify a "cut" mark.

8. The computer program product of claim 1, wherein the page description language comprises PostScript or Portable Document Format.

9. The computer program product of claim 1, wherein generating, based on the imposition-processed XML code, the representation of the document using the page description language comprises:
   identifying a piece of content to include in the document; and
   determining a height and a width of the identified piece of content.

10. The computer program product of claim 1, wherein generating, based on the imposition-processed XML code, the representation of the document using the page description language comprises:
    identifying an image to include in the document; and
    determining a resolution of the identified image.

11. A system for generating a representation of a document from eXtensible Markup Language (XML) code describing the document, comprising:
    a computer readable storage medium storing a plurality of modules, the plurality of modules comprising:
      a substitution module comprising an input and an output, wherein the input of the substitution module is coupled to receive the XML code describing the document, and wherein the substitution module is configured to output substitution-processed XML code, and wherein substitution-processing comprises:
        identifying, within the XML code describing the document, a conditional logic portion that comprises an expression and data;
        determining a Boolean value of the expression;

modifying, if the determined value is "true," the XML code describing the document by replacing the conditional logic portion with the data; and modifying, if the determined value is "false," the XML code describing the document by removing the conditional logic portion;

a composition module comprising an input and an output, wherein the input of the composition module is coupled to the output of the substitution module, and wherein the composition module is configured to output composition-processed XML code, and wherein composition-processing comprises:

identifying, within the substitution-processed XML code, content that is to be flowed;

identifying, within the substitution-processed XML code, a template through which the identified content is to be flowed;

determining whether the identified content fits within one instance of the identified template; and modifying, if the identified content does not fit within one instance of the identified template, the substitution-processed XML code to specify an additional instance of the identified template;

an imposition module comprising an input and an output, wherein the input of the imposition module is coupled to the output of the composition module, and wherein the imposition module is configured to output imposition-processed XML code, and wherein imposition-processing comprises:

identifying a code portion within the composition-processed XML code that is specified as being a logical page;

identifying a requested physical page size that represents a physical sheet of material; and modifying the composition-processed XML code to implement the requested physical page size by specifying one or more physical pages, wherein a physical page includes multiple logical pages, and wherein modifying the composition-processed XML code comprises changing a position of a  tag within the composition-processed XML code; and a generation module comprising an input and an output, wherein the input of the generation module is coupled to the output of the imposition module, and wherein the generation module is configured to generate the representation of the document using a page description language; and a processor configured to execute the plurality of modules stored by the computer readable storage medium.

12. The system of claim 11, wherein substitution-processing further comprises:

identifying, within the XML code describing the document, a variable;

determining a value of the variable; and modifying the XML code describing the document by replacing the variable with the determined value.

13. The system of claim 12, wherein the determined value comprises one element of a group containing document content information, XML code, an image, document layout information, and a template.

14. The system of claim 11, wherein composition-processing further comprises:

identifying, within the substitution-processed XML code, a second set of content that is to be repeated when a flow occurs; and modifying, if the identified content does not fit within one instance of the identified template, the substitution-processed XML code by adding the identified second set of content.

15. The system of claim 11, wherein composition-processing further comprises modifying, if the identified content does not fit within one instance of the identified template, the substitution-processed XML code to specify that the identified content will be placed within the additional instance of the identified template.

16. The system of claim 11, wherein imposition-processing further comprises determining a size of a spine of a book based on a number of pages within the book.

17. The system of claim 11, wherein imposition-processing further comprises modifying the composition-processed XML code to specify a "cut" mark.

18. The system of claim 11, wherein the page description language comprises PostScript or Portable Document Format.

19. The system of claim 11, wherein generating, based on the imposition-processed XML code, the representation of the document using the page description language comprises:

identifying a piece of content to include in the document; and determining a height and a width of the identified piece of content.

20. The system of claim 11, wherein generating, based on the imposition-processed XML code, the representation of the document using the page description language comprises:

identifying an image to include in the document; and determining a resolution of the identified image.

* * * * *